(12) United States Patent
Maekawa et al.

(10) Patent No.: US 10,035,186 B2
(45) Date of Patent: *Jul. 31, 2018

(54) SOLID GOLD-NICKEL ALLOY NANOPARTICLES AND PRODUCTION METHOD THEREOF

(71) Applicant: M. TECHNIQUE CO., LTD., Izumi-shi, Osaka (JP)

(72) Inventors: Masaki Maekawa, Izumi (JP); Kazuya Araki, Izumi (JP); Daisuke Honda, Izumi (JP); Masakazu Enomura, Izumi (JP)

(73) Assignee: M. TECHNIQUE CO., LTD., Izumi-Shi, Osaka (JP)

( * ) Notice: Subject to any disclaimer, the term of this patent is extended or adjusted under 35 U.S.C. 154(b) by 952 days.

This patent is subject to a terminal disclaimer.

(21) Appl. No.: 14/385,323

(22) PCT Filed: Mar. 15, 2013

(86) PCT No.: PCT/JP2013/057550
§ 371 (c)(1),
(2) Date: Sep. 15, 2014

(87) PCT Pub. No.: WO2013/137469
PCT Pub. Date: Sep. 19, 2013

(65) Prior Publication Data
US 2015/0098858 A1    Apr. 9, 2015

(30) Foreign Application Priority Data

Mar. 16, 2012 (JP) .................................. 2012-061022
Nov. 16, 2012 (WO) .................. PCT/JP2012/079871

(51) Int. Cl.
B22F 9/24    (2006.01)
B22F 1/00    (2006.01)
(Continued)

(52) U.S. Cl.
CPC .......... B22F 1/0003 (2013.01); B22F 1/0018 (2013.01); B22F 9/24 (2013.01);
(Continued)

(58) Field of Classification Search
None
See application file for complete search history.

(56) References Cited

U.S. PATENT DOCUMENTS 5,055,019 A    10/1991  Meyer et al.
9,732,401 B2 *  8/2017  Maekawa et al. ...... C22C 19/03
(Continued)

FOREIGN PATENT DOCUMENTS

CN    101790430 A    7/2010
CN    101795772 A    8/2010
(Continued)

OTHER PUBLICATIONS

Cárdenas-Lizana et al., "Tunable Gas Phase Hydrogenation of m-Dinitrobenzene over Alumina Supported Au and Au—Ni," Applied Catalysis A: General, Aug. 17, 2010, vol. 387, pp. 155-165.
(Continued)

*Primary Examiner* — George Wyszomierski
(74) *Attorney, Agent, or Firm* — Birch, Stewart, Kolasch & Birch, LLP

(57) ABSTRACT

The purpose of the present invention is to provide novel solid gold-nickel alloy nanoparticles and a production method thereof. Provided are solid gold-nickel alloy nanoparticles having a particle diameter of 500 nm or less. In particular, gold-nickel alloy nanoparticle are provided in which the concentration of nickel in the gold-nickel alloy is 2.0-92.7 wt %, and the main component is a gold-nickel alloy in which gold and nickel are in a nano-level fine mixed state. The gold-nickel alloy particles have as the main component a substitutional solid solution of gold and nickel.

(Continued)

Figure 1:
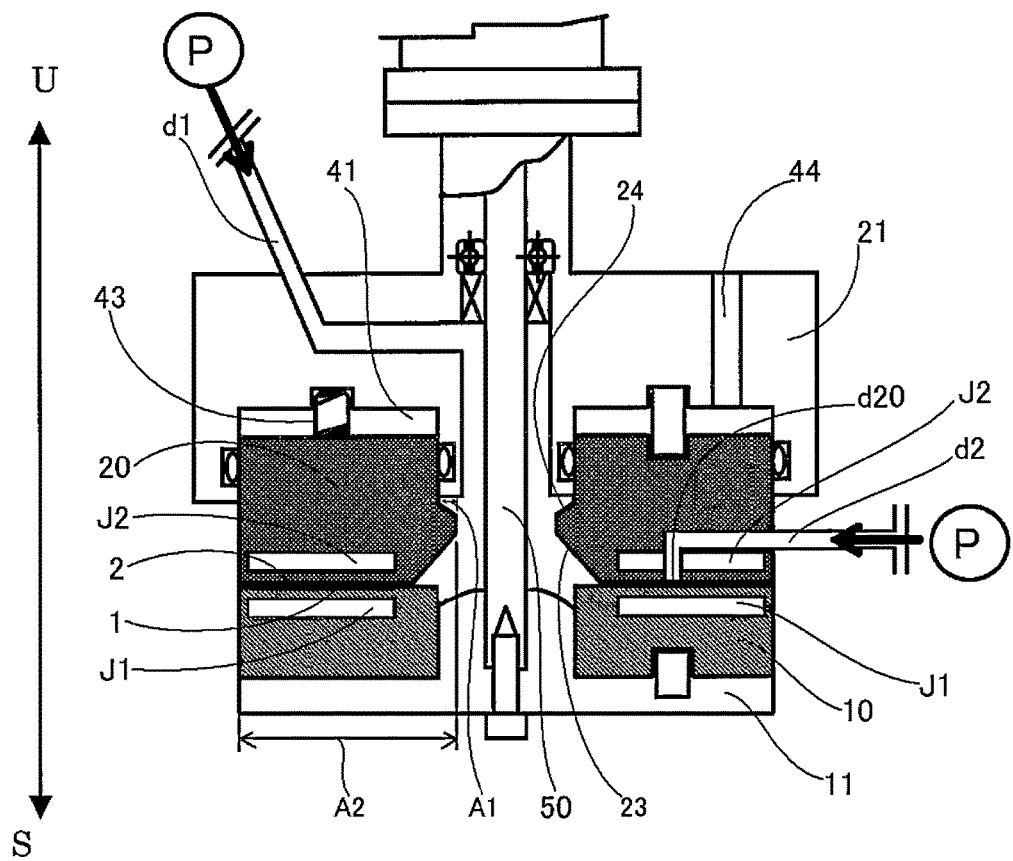

These gold-nickel alloy particles are optimally formed by mixing and discharging gold ions, and a substance having reducing characteristics in the thin film fluid occurring between processing surfaces which are arranged facing each other, which can move towards and away from each other, and at least one of which rotates relative to the other.

6 Claims, 17 Drawing Sheets

(51) Int. Cl.
  *C22C 5/02* (2006.01)
  *C22C 19/03* (2006.01)
  *B82Y 30/00* (2011.01)
  *C22C 30/00* (2006.01)

(52) U.S. Cl.
  CPC .............. *B82Y 30/00* (2013.01); *C22C 5/02* (2013.01); *C22C 19/03* (2013.01); *C22C 30/00* (2013.01)

(56) References Cited

U.S. PATENT DOCUMENTS

| | | | |
|---|---|---|---|
| 2003/0039860 A1* | 2/2003 | Cheon | B01J 13/02 428/843.4 |
| 2007/0172954 A1* | 7/2007 | Ismagilov | B01F 5/0646 436/53 |
| 2010/0155310 A1 | 6/2010 | Enomura | |
| 2010/0215958 A1 | 8/2010 | Enomura | |
| 2010/0243947 A1 | 9/2010 | Enomura | |
| 2010/0326321 A1 | 12/2010 | Enomura | |
| 2010/0327236 A1 | 12/2010 | Enomura | |
| 2011/0147220 A1 | 6/2011 | Zhang-Beglinger et al. | |

FOREIGN PATENT DOCUMENTS

| | | |
|---|---|---|
| CN | 101796143 A | 8/2010 |
| CN | 101801520 A | 8/2010 |
| CN | 101868316 A | 10/2010 |
| CN | 102343442 A | 2/2012 |
| EP | 2 184 109 A1 | 5/2010 |
| JP | 2-64010 A | 3/1990 |
| JP | 3-504596 A | 10/1991 |
| JP | 7-94012 A | 4/1995 |
| JP | 10-216518 A | 8/1998 |
| JP | 2002-226926 A | 8/2002 |
| JP | 2003-226901 A | 8/2003 |
| JP | 2006-63347 A | 3/2006 |
| JP | 2006-299385 A | 11/2006 |
| JP | 2008-49336 A | 3/2008 |
| JP | 2009-144250 A | 7/2009 |
| JP | 2009-289587 A | 12/2009 |
| JP | 2010-24478 A | 2/2010 |
| JP | 2011-122236 A | 6/2011 |
| JP | 2011-143340 A | 7/2011 |
| WO | WO 90/11256 A1 | 10/1990 |
| WO | WO 2009/008390 A1 | 1/2009 |
| WO | WO 2009/008393 A1 | 1/2009 |

OTHER PUBLICATIONS

She et al., "Structure, Optical and Magnetic Properties of Ni@Au and Au@Ni Nanoparticles Synthesized via Non-Aqueous Approaches," Journal of Materials Chemistry, 2012, vol. 22, XP55215294A, pp. 2757-2765.

Soulé et al., "Powerful Amide Synthesis from Alcohols and Amines under Aerobic Conditions Catalyzed by Gold or Gold/Iron, -Nickel or -Cobalt Nanoparticles," Journal of the American Chemical Society, Oct. 21, 2011, vol. 133, XP55171065A, pp. 18550-18553.

European Patent Convention Communication for Application No. 13 760 371.8, dated Apr. 11, 2018.

Lu, Da-Ling et al., "Electrodeposited Au-Fe, Au-Ni, and Au-Co Alloy Nanoparticles from Aqueous Electrolytes", Langmuir, vol. 18, No. 8, Apr. 1, 2002, pp. 3226-3232.

Zhou, Shenghu et al., "In Situ Phase Separation of NiAu Alloy Nanoparticles for Preparing Highly Active Au/NiO CO Oxidation Catalysts", ChemPhysChem, vol. 9, No. 17, Dec. 1, 2008, pp. 2475-2479.

* cited by examiner

SOLID GOLD-NICKEL ALLOY NANOPARTICLES AND PRODUCTION METHOD THEREOF

TECHNICAL FIELD

The present invention relates to solid gold-nickel alloy nanoparticles and production method thereof.

In recent years, a gold-nickel alloy particle is receiving an attention as a material such as, for example, a magnetic sensor, an electrode material, a capacitor, a catalyst, and a contact material. There is a possibility that characteristics thereof may be controlled by the ratio of gold and nickel in the gold-nickel alloy particle; and for example, it is known that even the gold-nickel alloy in the state wherein gold and nickel are not homogeneously mixed cannot only express performances as a highly reliable electric contact material such as a connector, a small relay, and a printed circuit board, these being used as a part of an electronic part, and but also improve performances such as heat resistance, abrasion resistance, and catalytic performance, as compared with a gold single body. Because of these, the gold-nickel alloy is a material that is wanted in a wide range of an industrial field. However, similarly to a silver-copper alloy, generally the gold-nickel alloy forms a eutectic body so that it is difficult to form a solid solution of homogeneously mixed gold and nickel. Therefore, in many cases, the expected characteristics mentioned above as the gold-nickel alloy are not fully realized. Moreover, the gold-nickel alloy is expected not only to further improve the existing characteristics but also to express novel characteristics by making it a nanoparticle; and thus, a gold-nickel alloy nanoparticle is eagerly wanted.

As discussed above, in a solid alloy which contains gold and nickel, gold and nickel can exist in various forms; and it is shown that in an equilibrium diagram thereof, there is a specific region in which gold and nickel forms, for example, a eutectic body thereof, whereby they do not mix with each other and there is a solid phase in which they are eccentrically located. In such a specific region, gold and nickel which constitute the alloy thereof show an eccentrically located state in which the composition ratio of the entire alloy of gold and nickel is largely different from the composition ratio of the same within an extremely small area with a nanometer level; and as a result, in many cases, the characteristics expected as the alloy thereof are not fully realized.

As to a production method of the gold-nickel alloy particle, a powder metallurgy method has been generally used; and in addition, as the other methods, there are such methods as a liquid phase reduction method as described in Patent Document 1, an atomizing method as described in Patent Document 2, and so forth. However, there has been no report yet with regard to a gold-nickel alloy in which gold and nickel are mixed homogeneously, especially with regard to a gold-nickel alloy nanoparticle and a method for proving the same. Other than these methods, there is a method in which metal gold and metal nickel are rapidly cooled from the state of the solid solution thereof at high temperature thereby obtaining a solid solution of a gold-nickel alloy particle; however, this method tends to make the obtained gold-nickel alloy particle inhomogeneous, and in addition, this requires large energy, so that there are problems of a natural tendency to a high production cost and so forth.

In Patent Document 3 filed by the applicant of the present invention, a method for producing a microparticle was provided. However, analysis of the particle obtained by using this disclosed method showed that it was an inhomogeneous gold-nickel alloy particle. Therefore, a gold-nickel alloy nanoparticle, especially a gold-nickel alloy nanoparticle that is a homogeneous solid solution, as well as a method for producing the same, has been eagerly wanted.

In Patent Document 4, which is filed by the present applicant, the producing method of the silver-copper alloy particle is disclosed; however, analysis of the particle obtained by the producing method thereof shown by Example reveals that this particle is the silver-copper alloy particle formed of the eutectic body or mixture of single bodies of silver and copper. Accordingly, there has been no disclosure as to the silver-copper alloy substantially not containing the eutectic body, especially as to the solid solution type silver-copper alloy.

The apparatus shown in Patent Document 3 and 4 is the one in which fine particles are separated in a thin film fluid formed between at least two processing surfaces which are disposed in a position they are faced with each other so as to be able to approach to and separate from each other, at least one of which rotates relative to the other; and this apparatus is expected to be actively utilized in production of the particles especially with the size in the level of nanometers. Inventors of the present invention tried to produce various nanoparticles by using this apparatus; however, all the relationships between the separation and reaction conditions and the results thereof have not been clarified yet.

Specifically, although it is not the solid gold-nickel alloy nanoparticle, in a solid metal alloy particles, it was confirmed that in the platinum-palladium alloy, the analysis result of the TEM-EDS of one point thereof was almost identical to the ICP analysis result thereof, wherein, the platinum-palladium alloy was said to be an all proportional solid solution metal, in spite that there is a tendency of phase separation at low temperature. On the other hand, as to a silver-copper alloy, only the silver-copper alloy particle in the state of a eutectic body thereof or of the mixture of a silver single body and a copper single body could be obtained.

Figure 14:
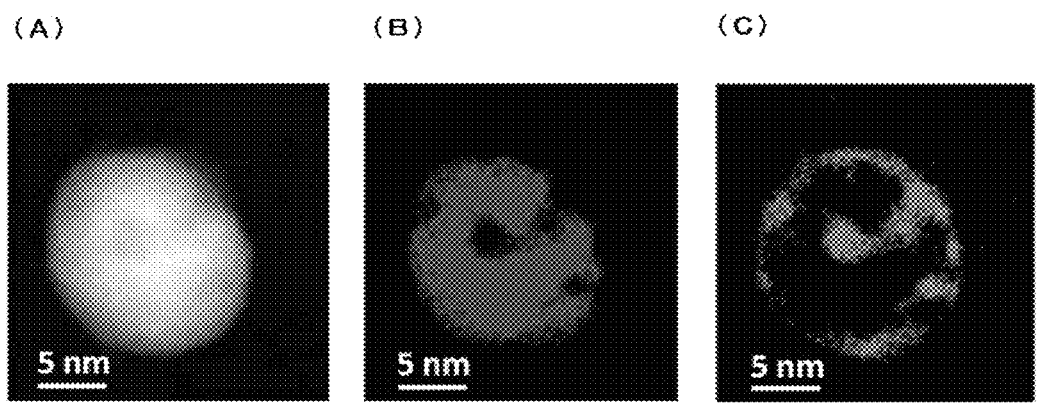
Figure 15:
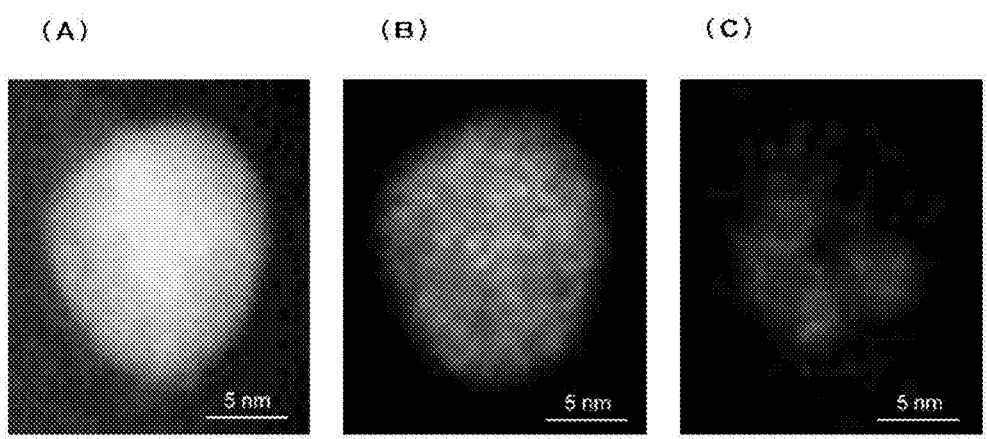
Figure 16:
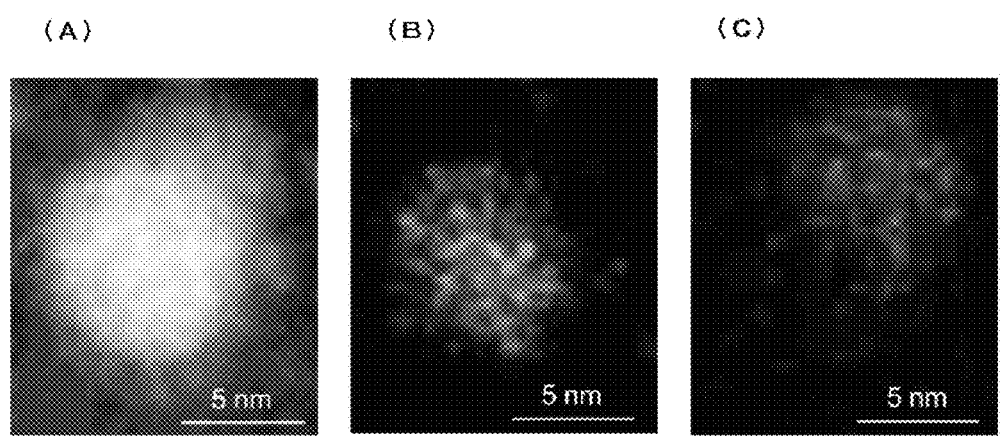

More specifically, obtained therein were the silver-copper alloy particles that are similar to those shown in FIG. 14 to FIG. 16. In FIG. 14(A) the STEM-HAADF picture thereof is shown; in FIG. 14(B) the EELS mapping result (Ag) thereof is shown; and in FIG. 14(C) the EELS mapping result (Cu) thereof is shown. Results of FIG. 14 were obtained by using the energy dispersive X-ray analyzer Centurio (manufactured by JEOL Ltd.) and by the atomic resolution analytical electron microscope JEM-ARM 200F (manufactured by JEOL Ltd.) with the acceleration voltage of 200.0 kV and the magnification of 6000000. In FIG. 15(A) the STEM-HAADF picture thereof is shown; in FIG. 15(B) the STEM mapping result (Ag) thereof is shown; and in FIG. 15(C) the STEM mapping result (Cu) thereof is shown. Results of FIG. 15 were obtained by using the Cs corrector-equipped super high resolution STEM analyzer HD-2700 (equipped with EDX) (manufactured by Hitachi High-Technologies Corp.) with the acceleration voltage of 200.0 kV and the magnification of 2200000. In FIG. 16(A) the STEM-HAADF picture thereof is shown; in FIG. 16(B) the STEM mapping result (Ag) thereof is shown; and in FIG. 16(C) the STEM mapping result (Cu) thereof is shown. Results of FIG. 16 were obtained by using the Cs corrector-equipped super high resolution STEM analyzer HD-2700 (equipped with EDX) (manufactured by Hitachi High-Technologies Corp.) with the acceleration voltage of 80.0 kV and the magnification of 2000000.

In the silver-copper alloy particle in FIG. 14, copper is present in center of the particle (core), silver is present around it (shell), and copper is present on surface of the silver-copper alloy particle (average particle diameter of about 20 nm). From FIG. 14 (B) and (C), it can be seen that there are some places where silver or copper is not present, namely, there are some places where 100% of silver is present or 100% copper is present. The silver-copper alloy particle in FIG. 15 is the silver-copper alloy particle (average particle diameter of about 15 nm) in which silver and copper are eccentrically located in the same particle. Especially from (C), it can be seen that there is a place where copper is not present, that is, there is a place where 100% silver is present.

The silver-copper alloy particle in FIG. 16 is the silver-copper alloy particle (average particle diameter of about 15 nm) comprising silver in half of it, namely, 100% silver being present therein, and copper in the other half, namely, 100% copper being present therein in the same particle.

Figure 17:
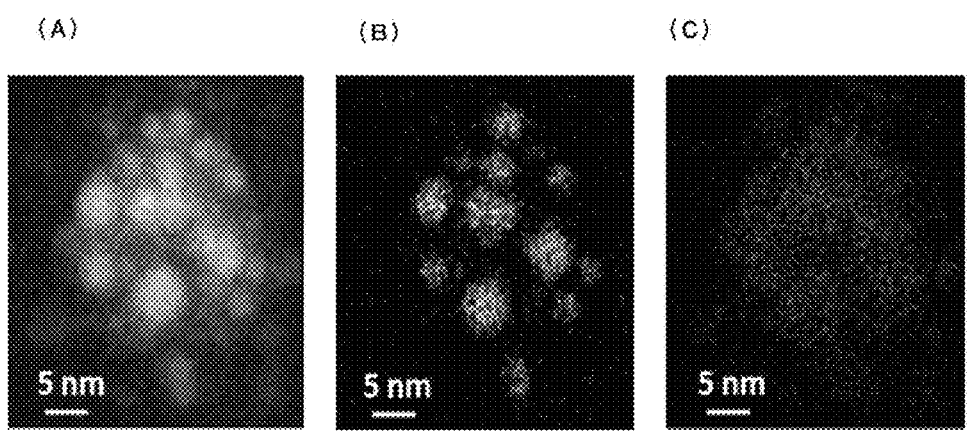

FIG. 17 shows the silver-antimony alloy particle; and in FIG. 17(A) the STEM-HAADF picture thereof is shown; in (B) the STEM mapping result (Ag) thereof is shown; and in (C) the STEM mapping result (Sb) thereof is shown. These were obtained by using the energy dispersive X-ray analyzer Centurio (manufactured by JEOL Ltd.) and by the atomic resolution analytical electron microscope JEM-ARM 200F (manufactured by JEOL Ltd.) with the acceleration voltage of 200.0 kV and the magnification of 6000000.

In this silver-antimony alloy particle (particle diameter of about 20 nm), silver particles having the size of 2 to 5 nm are present in the same particle, wherein there is a place where 100% of antimony is present between silver particles by the EDS analysis without any silver present.

PRIOR ART DOCUMENTS

Patent Document

Patent Document 1: Japanese Patent Laid-Open Publication No. 2011-122236
Patent Document 2: Japanese Patent Laid-Open Publication No. 2009-289587
Patent Document 3: International Patent Laid-Open Publication No. 2009/008393
Patent Document 4: International Patent Laid-Open Publication No. 2009/008390

DISCLOSURE OF THE INVENTION

Problems to be Solved by the Invention

In view of the situation mentioned above, problems to be solved by the present invention are to provide a gold-nickel alloy nanoparticle that can fully express the afore-mentioned characteristics as the gold-nickel alloy nanoparticle and to provide a method for producing the same.

Means for Solving the Problems

The present invention solves the problem as mentioned above by providing a solid gold-nickel alloy nanoparticle and a method for producing the same.

The present invention may be executed as an embodiment of a solid gold-nickel alloy nanoparticle wherein as a result of microrange analysis of the solid gold-nickel alloy nanoparticle by a TEM-EDS analysis using a beam diameter of 5 nm, molar ratios of gold and nickel in 50% or more of analysis points thereof are detected within ±30% of molar ratios of gold and nickel obtained by ICP analysis result of the solid gold-nickel alloy nanoparticle.

In addition, the present invention may be executed as an embodiment of a solid gold-nickel alloy nanoparticle wherein as a result of microrange analysis of the solid gold-nickel alloy nanoparticle by a STEM-EDS analysis using a beam diameter of 0.2 nm, molar ratios of gold and nickel in 50% or more of analysis points thereof are detected within ±30% of molar ratios of gold and nickel obtained by ICP analysis result of the solid gold-nickel alloy nanoparticle.

Further, the present invention may be executed as an embodiment of a solid gold-nickel alloy nanoparticle wherein a nickel concentration contained in the gold-nickel alloy is in the range of 2.0 to 92.7% by weight, and the solid gold-nickel alloy nanoparticle comprises mainly a gold-nickel alloy showing a finely mixed state of gold and nickel in a nanometer level.

The gold-nickel alloy nanoparticle of the present invention shows a finely mixed state of gold and nickel in a nanometer level even in a particular solid phase region showing a non-solid solution state in an equilibrium diagram thereof. Meanwhile, in this particular solid phase region showing the non-solid solution state, gold and nickel are eccentrically located; and in the gold-nickel alloy, it is a region which includes a eutectic body of gold and nickel.

The region in which gold and nickel are eccentrically located is a region in which in the entire of the gold-nickel alloy nanoparticle the composition ratio of gold and nickel to constitute the alloy is different by more than ±30% from the composition ratio of gold and nickel to constitute the alloy within an extremely small area with the size in the level of nanometers by microrange analysis. More specifically, as a result of microrange analysis by a TEM-EDS analysis using a beam diameter of 5 nm or as a result of microrange analysis by a STEM-EDS analysis using a beam diameter of 0.2 nm, in 50% or more of analysis points, the two metals are present in the mixed state thereof with molar ratios of gold and nickel are detected over ±30% of molar ratios of gold and nickel obtained by ICP analysis result of the gold-nickel alloy nanoparticle. Conventional alloys are in the state in which of the at least two metals to constitute the alloy, one metal is not present in these regions, for example, as shown in FIG. 14 to FIG. 17.

On the other hand, the gold-nickel alloy nanoparticle of the present invention shows that gold and nickel are present as a finely mixed state in the level of nanometers. In the gold-nickel alloy nanoparticle of the present invention, preferably, both gold and nickel are detected in the range of 2.0 to 92.7% by weight of concentration of nickel contained in the gold-nickel alloy in all of the analysis points as a result of the microrange analysis by the TEM-EDS analysis using a beam diameter of 5 nm. In addition, in the gold-nickel alloy nanoparticle of the present invention, both gold and nickel are detected in the range of 2.0 to 92.7% by weight of concentration of nickel contained in the gold-nickel alloy in all of the analysis points as a result the microrange analysis by the STEM-EDS analysis using a beam diameter of 0.2 nm.

In the technology level today, accurate judgment whether the obtained gold-nickel alloy nanoparticle is a solid solution or not cannot be made without using the TED-EDS analysis or the STED-EDS analysis as mentioned above. On top that, it is also important to confirm distribution of the elements of gold to nickel by mapping. Inventors of the present invention carried out an extensive investigation as to various conditions including a fluid which contains metal ions to constitute the alloy and a fluid which contains a reducing agent by using the apparatus shown in Patent Document 4 with which only alloy particles similar to those shown in FIG. 14 to FIG. 17 had been obtained; and a result of it, they could succeed to develop the alloy showing the finely mixed state of gold to nickel in the level of nanometers.

As discussed above, the gold-nickel alloy nanoparticle thereof in the present invention can fully express the characteristics expected as the alloy because gold and nickel show the finely mixed state thereof in the level of nanometers.

In the gold-nickel alloy nanoparticle of the present invention, it is thought that the alloy comprises mainly non-eutectic body structure not containing eutectic body of gold and nickel.

In addition, it is thought that the gold-nickel alloy nanoparticle of the present invention comprises mainly a substitutional solid solution of gold and nickel. As it is well known, a solid solution is classified roughly into an interstitial solid solution and a substitutional solid solution; the gold-nickel alloy nanoparticle that is obtained by the present invention is recognized as the substitutional solid solution. The substitutional solid solution and the interstitial solid solution may be differentiated by observation with TEM and STEM, XRD measurement, thermal analysis, and the like, while observation with TEM and STEM is especially effective. The substitutional solid solution is the solid solution in which metal elements at the lattice point in the space lattice are substituted by other elements. Because of this, in the substitutional solid solution, a lattice fringe can be clearly observed especially by observation of the alloy with TEM or STEM; and because of the effect of strain of the crystal lattice caused by replacement of the metal element with other element at the lattice point, the lattice fringe is observed as the surged fringe. On the other hand, in the interstitial solid solution, other element enters into the space of the crystal lattice, so that the alloy is observed by TEM or STEM in the state different from that of the substitutional solid solution alloy.

In the present invention, the gold-nickel alloy nanoparticle may be produced by mixing a gold ion, a nickel ion, and a substance having a reducing property in a thin film fluid formed between at least two processing surfaces which are disposed in a position they are faced with each other so as to be able to approach to and separate from each other, at least one of which rotates relative to the other, whereby separating the gold-nickel alloy nanoparticle. Specifically, it may be produced by using the apparatus shown in Patent Documents 3 and 4.

The substance having a reducing property of the present invention may be at least two substances each having a reducing property.

Furthermore, in the present invention, the said at least two reducing substances each having a reducing property may be at least one substance selected from the group consisting of a reducing agent, a dispersant showing a reducing property, and a solvent showing a reducing property; and hydrazine monohydrate may be exemplified as the above-mentioned reducing agent.

In this apparatus, inventors of the present invention assume that because the reducing reaction of gold to nickel could be controlled in the atomic level, a homogenous mixing state of the gold-nickel alloy could be realized in the atomic level by controlling various conditions including kinds of the processing fluids, pH thereof, mole ratio of the gold ion and the nickel ion, rotation number of the processing surfaces, and so forth.

The present invention may be executed as an embodiment wherein the gold-nickel alloy nanoparticle has a particle diameter of 500 nm or less, or further a particle diameter of 100 nm or less.

The present invention is a method for producing the gold-nickel alloy nanoparticle, and may be executed as an embodiment, wherein a fluid to be processed is supplied to between processing surfaces which relatively moves so as to be able to approach to and separate from each other, a distance between the processing surfaces is kept in a minute space by a balance between a force toward an approaching direction and a force toward a separating direction, the forces including a supply pressure of the fluid to be processed and a pressure applied between the rotating processing surfaces; by using this minute space kept between at least two processing surfaces as a flow path of the fluid to be processed, the fluid to be processed forms a thin film fluid, and in this thin film fluid the gold-nickel alloy microparticle is separated.

The present invention may be executed as an embodiment wherein at least two fluids, a first fluid and a second fluid, are used as the fluids to be processed, the first fluid contains a gold ion and a nickel ion, at least any one of the first fluid and the second fluid contains a substance having a reducing property, and the fluids to be processed are mixed in the thin film fluid.

Alternatively, the present invention may be executed as an embodiment wherein the substance having a reducing property is at least two substances each having a reducing property; and by using the at least two substances each having a reducing property, gold and nickel are separated out simultaneously. Namely, it is preferable that the separation times of gold and nickel to constitute the gold-nickel alloy nanoparticle be controlled such that they may be separated simultaneously whereby gold and nickel each may not be separated out as respective single bodies; and therefore, by using at least two substances each having a reducing property, the separation times of gold and nickel each is controlled so that it becomes easy to separate out gold and nickel substantially at the same time; and as a result, the gold-nickel alloy nanoparticle showing the mixed state of gold and nickel in a nanometer level may be separated. As a matter of course, even when one substance having a reducing property is used, it is possible to obtain the gold-nickel alloy nanoparticle showing the mixed state of gold and nickel in a nanometer level.

Moreover, the present invention may be executed as an embodiment wherein the at least two substances each having a reducing property is at least one substance selected from the group consisting of a reducing agent, a dispersant showing a reducing property, and a solvent showing a reducing property.

In the solid gold-nickel alloy nanoparticle of the present invention, gold and nickel in the gold-nickel alloy are substantially mixed together; and thus, performance as a high-reliable electric contact material may be expressed, and in addition, characteristics expected as the gold-nickel alloy, such as heat resistance, abrasion resistance, catalysis performance, and so forth may be fully expressed.

FIG. 1:

This shows a rough sectional view of the fluid processing apparatus according to the embodiment of the present invention.

FIG. 2:

This shows (A) a rough plane view of the first processing surface of the fluid processing apparatus shown in FIG. 1, and (B) an enlarged drawing of the essential part of the processing surface of the said apparatus.

FIG. 3:

This shows (A) a cross section view of the second introduction part of the said apparatus, and (B) an enlarged drawing of the essential part of the processing surface to explain the said second introduction part.

FIG. 4:

This shows an equilibrium diagram of Au—Ni alloy.

FIG. 5:

This shows the TEM picture of the gold-nickel alloy nanoparticle prepared in Example 1.

FIG. 6:

This shows the STEM picture of the gold-nickel alloy nanoparticle prepared in Example 2 and the STEM-EDS analysis points (4 points) in the gold-nickel alloy nanoparticle of the said STEM picture.

FIG. 7:

This shows the TEM picture of the gold-nickel alloy nanoparticle prepared in Example 3 and the TEM-EDS analysis points (5 points) in the gold-nickel alloy nanoparticle of the said TEM picture.

Figure 6:
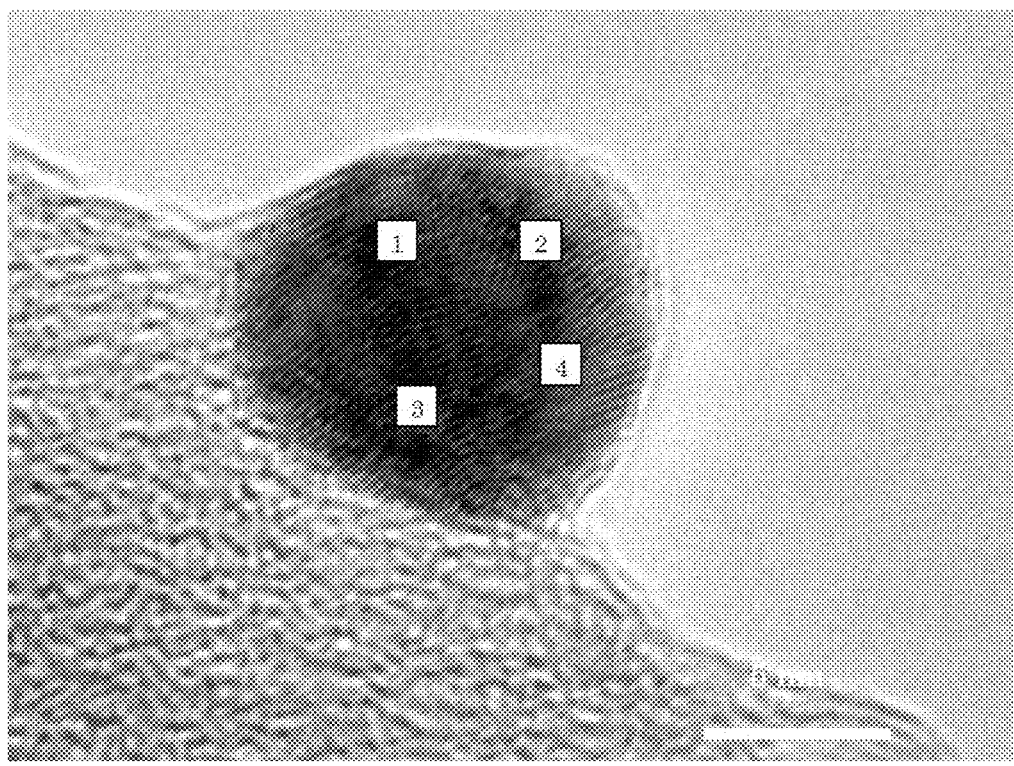

FIG. 8:

This shows the EDS analysis results measured at each of the STEM-EDS analysis points shown in FIG. 6 of the gold-nickel alloy nanoparticle prepared in Example 2.

Figure 7:
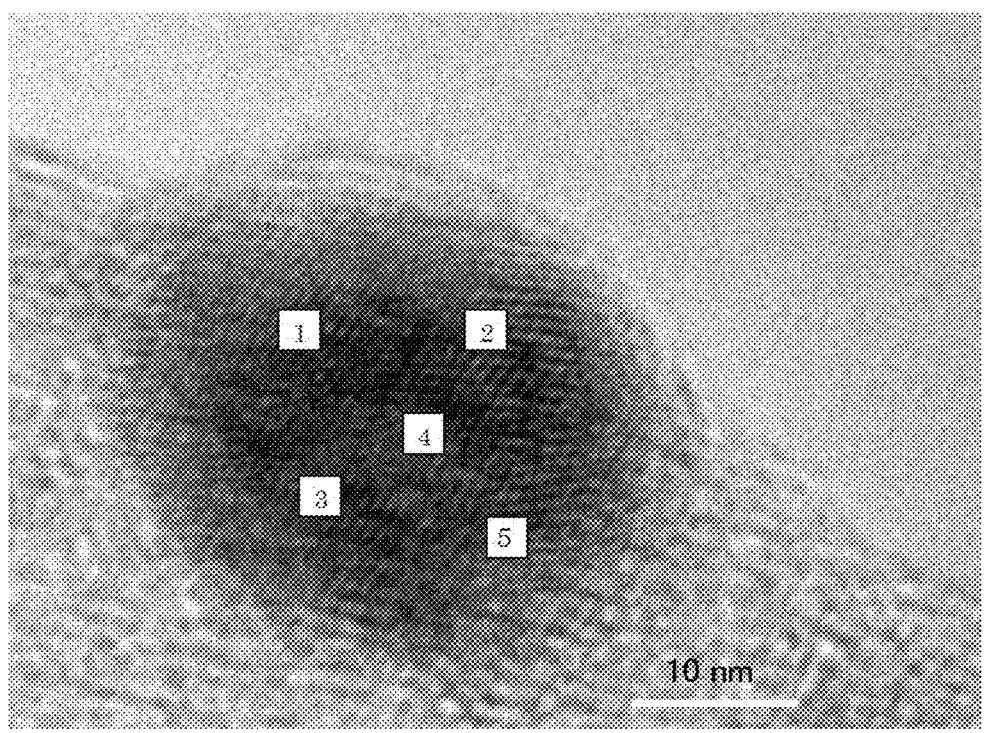

FIG. 9:

This shows the EDS analysis results measured at each of the TEM-EDS analysis points, shown in FIG. 7, of the gold-nickel alloy nanoparticle prepared in Example 3.

FIG. 10:

This shows the low magnification TEM picture of the gold-nickel alloy nanoparticle prepared in Example 1.

FIG. 11:

This shows (A) the STEM-HAADF picture, (B) the EDS mapping result (Au), and (C) the EDS mapping result (Ni) of the gold-nickel alloy nanoparticle prepared in Example 5.

FIG. 12:

This shows (A) the STEM-HAADF picture (dark view) and (B) the STEM-BF (bright view) picture of the gold-nickel alloy nanoparticle prepared in Example 5 (magnification of 12 million in both (A) and (B)).

FIG. 13:

This shows (A) the STEM-HAADF picture (dark view) and (B) the STEM-BF (bright view) picture of the gold-nickel alloy nanoparticle prepared in Example 5 (magnification of 60 million in both (A) and (B)).

FIG. 14:

This shows (A) the STEM-HAADF picture, (B) the EELS mapping results (Ag), and (C) the EELS mapping results (Cu) of the observation results with an electron microscope which shows an example of a conventional silver-copper alloy particle.

FIG. 15:

This shows (A) the STEM-HAADF picture, (B) the STEM mapping results (Ag), and (C) the STEM mapping results (Cu) of the observation results with an electron microscope which shows other example of a conventional silver-copper alloy particle.

FIG. 16:

This shows (A) the STEM-HAADF picture, (B) the STEM mapping results (Ag), and (C) the STEM mapping results (Cu) of the observation results with an electron microscope which shows still other example of a conventional silver-copper alloy particle.

FIG. 17:

This shows (A) the STEM-HAADF picture, (B) the STEM mapping results (Ag), and (C) the STEM mapping results (Cu) and (Sb) of the observation results with an electron microscope which shows other illustrative example of a conventional silver-antimony alloy particle.

BEST MODES FOR CARRYING OUT THE INVENTION

Hereunder, one embodiment of the present invention will be specifically explained.

The gold-nickel alloy nanoparticle of the present invention shows a finely mixed state of gold and nickel in a nanometer level in a particular solid phase region in which gold and nickel are eccentrically located in an equilibrium diagram of this alloy.

In the gold-nickel alloy, specific regions of the solid phase in which the gold and nickel are eccentrically located are shown in the alloy equilibrium diagrams, including the region which comprises mainly a eutectic body of the gold and nickel to constitute the alloy, and the region which is an inhomogeneous solid solution even if the gold and the nickel form a solid solution.

Figure 4:
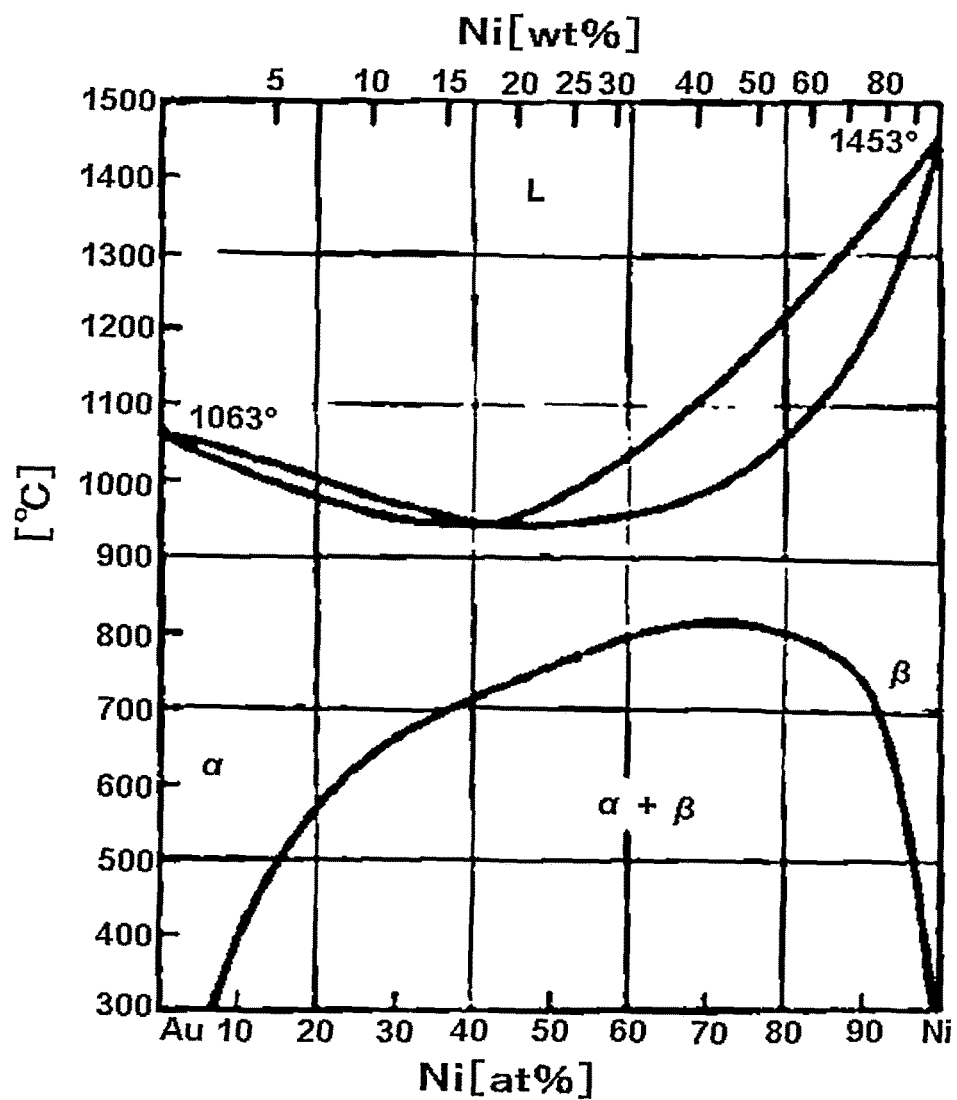

Specifically, it is the α+β region in the equilibrium diagram of the gold-nickel alloy shown in FIG. 4. As it is well known, the state of an alloy changes with temperature; and under a specific temperature condition of a solid having a specific composition ratio, gold and nickel are eccentrically located.

In the gold-nickel alloy, two metals are completely dissolved with each other in a liquid phase, while they form a solid solution partially with each other in a solid phase. Accordingly, the region shown as (α+β) in the molar ratio (fraction) of the gold-nickel alloy is in the state in which the α phase and the β phase exist as two separated phases, so that this region is in the state in which the α phase and the β phase are eccentrically located in a very fine level.

On the other hand, in the gold-nickel alloy nanoparticle of the present invention, in the equilibrium diagram of the gold-nickel alloy shown in FIG. 4, gold and nickel to constitute the alloy shows a finely mixed state in a nanometer level even in the α+β region.

Solid gold-nickel alloy nanoparticle, gold-nickel alloy showing finely mixed state of gold and nickel in the level of nanometers, and the nanoparticle thereof:

The solid gold-nickel alloy nanoparticle of the present invention is the gold-nickel alloy nanoparticle whose particle diameter is 500 nm or less, preferably the gold-nickel alloy nanoparticle whose particle diameter is 100 nm or less, or more preferably the gold-nickel alloy nanoparticle whose particle diameter is 50 nm or less.

Further, the solid gold-nickel alloy nanoparticle of the present invention is a nanoparticle mainly comprising the gold-nickel alloy (AuNi alloy) which shows the finely mixed state of the gold and nickel, in the level of nanometers, wherein nickel concentration in the gold-nickel alloy is in the range of 2.0 to 92.7% by weight, or preferably in the range of 3.0 to 90.0% by weight. A general Au—Ni alloy equilibrium diagram is shown in FIG. 4; generally, conventional alloys have the mixed state of the α-phase and the β-phase. In the present invention, the gold-nickel alloy is homogeneous even in this region, whereby the gold-nickel alloy comprises mainly the alloy which is made so as to show the finely mixed state of gold and nickel in the level of nanometers. With this, not only performance as a high-reliable electric contact material of electronic parts such as a connector, a small relay, and a printed wire board can be expressed, but also characteristics expected as the gold-nickel alloy, that is, heat resistance, abrasion resistance, catalysis performance, and so forth can be expressed. As mentioned above, the gold-nickel alloy of the present invention is the gold-nickel alloy mainly comprising an alloy showing a finely mixed state of gold and nickel in a nanometer level. In the present invention, "gold-nickel alloy mainly comprising an alloy showing a finely mixed state of gold and nickel in a nanometer level" shall mean the gold-nickel alloy wherein 50% or more by volume of the gold-nickel alloy of the present invention is the alloy showing a finely mixed state of gold and nickel in a nanometer level. Further, illustrative example of the alloy showing a finely mixed state of gold and nickel in a nanometer level in the present invention includes a solid solution and an amorphous thereof.

As mentioned above, inventors of the present invention observed the gold-nickel alloy nanoparticle of the present invention by means of various instruments at room temperature, and determined that the gold-nickel alloy nanoparticle of the present invention was the solid gold-nickel alloy nanoparticle mainly comprising an alloy showing a finely mixed state of gold and nickel in a nanometer level.

More specifically, a gold-nickel alloy nanoparticle which was under the temperature of room temperature was placed under the environment of the microscopic analysis (TEM-EDS analysis or STEM-EDS analysis) used in Example as mentioned later and was exposed to an electron beam with an acceleration voltage of 200 kV; and under this condition, this was confirmed to be the gold-nickel alloy nanoparticle mainly comprising an alloy showing a finely mixed state of gold and nickel in a nanometer level. During this observation, the temperature of the specimen itself exposed to the electron beam was not controlled.

The analysis method as to the homogeneity of gold and nickel in the gold-nickel alloy and as to whether or not the gold-nickel alloy mainly comprises the alloy which is made so as to show the finely mixed state of gold and nickel in the level of nanometers is not particularly restricted, though a microscopic analysis method is preferable; especially for analysis in an extremely small area, an analysis method by which the distribution state of gold and nickel as well as the weight ratio or the mole ratio thereof can be analyzed is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). Other methods may be used, too; but to demonstrate the homogeneity of gold and nickel in the gold-nickel alloy and whether or not the gold-nickel alloy mainly comprises the alloy which is made so as to show the finely mixed state of gold and nickel in the level of nanometers, a spectroscopic analysis is preferable. As to the gold-nickel alloy of the present invention which is the homogeneous gold-nickel alloy and comprises mainly the alloy which is made so as to show the finely mixed state of gold and nickel in the level of nano-meters, the gold-nickel alloy nanoparticles shown by the TEM pictures and the STEM picture in FIG. 5, FIG. 6, and FIG. 7 and STEM-HAADEF picture shown in FIG. 11 (FIG. 11 (A)) and the EDS mapping result relating to these (FIG. 11 (B) and (C). Respectively (B) is mapping result of Au and (C) is mapping result of Ni) may be exemplified.

Figure 5:
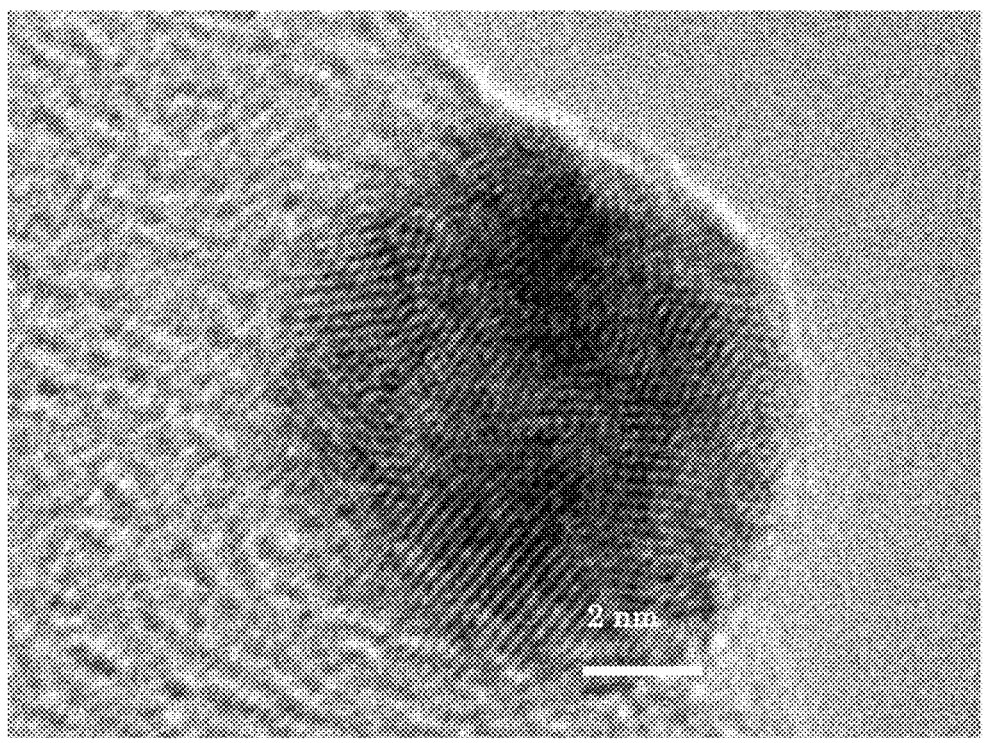

As to the gold-nickel alloy nanoparticles shown in FIG. 5, the ICP analysis result of the gold-nickel alloy nanoparticle powders is Au:Ni=50.1:49.9 (mole ratio); in other words, the concentration of nickel contained in the gold-nickel alloy is 22.9% by weight. As to the gold-nickel alloy nanoparticles shown in FIG. 6, the ICP analysis result of the gold-nickel alloy nanoparticle powders is Au:Ni=14.9:85.1 (mole ratio); in other words, the concentration of nickel contained in the gold-nickel alloy is 63.0% by weight. As to the gold-nickel alloy nanoparticles shown in FIG. 7, the ICP analysis result of the gold-nickel alloy nanoparticle powders is Au:Ni=74.1:25.9 (mole ratio); in other words, the concentration of nickel contained in the gold-nickel alloy is 9.4% by weight. In the gold-nickel alloy nanoparticles mentioned above, it was not confirmed that gold and nickel each was clearly segregated in a single nanoparticle, even though all the ratios of gold to nickel were in the α+β region in the Au—Ni alloy equilibrium diagram; and in addition, the region of gold only or the region of nickel only could not be confirmed. It is clear from the mapping result shown in FIG. 11 (B) and (C). In FIG. 6, the STEM-EDS analysis points (4 points) by using a beam diameter of 0.2 nm in the gold-nickel alloy nanoparticle are shown; and in FIG. 8, the EDS analysis results obtained by analyzing at respective analysis points shown in FIG. 6 are shown. In the gold-nickel alloy nanoparticle of the present invention, as the result of the microregion analysis by the STEM-EDS analysis using the beam diameter of 0.2 nm, in 50% or more of the analysis points, the mole ratios of gold to nickel are detected preferably within ±30% of the mole ratios of gold to nickel obtained by the ICP analysis result; and then, from the analysis results shown in FIG. 8, in 50% or more of the analysis points, the mole ratios of gold to nickel by the STEM-EDS analysis are detected within ±30% of the mole ratios of gold to nickel obtained by the ICP analysis result, and thus, this condition is fulfilled. The 0.2-nm beam is nearly equal to the atomic radius of gold and of nickel; however, in the actual observation, because informations of the depth direction and of the surrounding area are taken, it is possible to take informations substantially in the larger area than the atom size of gold and of nickel. If the gold-nickel alloy nanoparticle is inhomogeneous, or contains the portion in which was not made so as to show the finely mixed state of gold and nickel in the level of nano-meters, then there should be many analysis points at which the ratios of gold to nickel in the gold-nickel alloy nanoparticles are the ratios of gold to nickel in α or β, respectively. And thus, it can be seen that the above-mentioned gold-nickel alloy nanoparticles are the homogeneous gold-nickel alloy and are the gold-nickel alloy which is made so as to show the finely mixed state of gold and nickel in the level of nanometers. Further, in FIG. 7, the TEM-EDS analysis points (5 points) by using a beam diameter of 5 nm in the gold-nickel alloy nanoparticle are shown; and in FIG. 9, the EDS analysis results obtained by analyzing at respective analysis points shown in FIG. 7 are shown. In the gold-nickel alloy nanoparticles of the present invention, as the result of analysis of the microregion analysis by the TEM-EDS analysis using the beam diameter of 5 nm, in 50% or more of the analysis points, the mole ratios of gold to nickel are detected within ±30% of the mole ratios of gold to nickel obtained by the ICP analysis result; and then, from the analysis results shown in FIG. 9, in 50% or more of the analysis points, the mole ratios of gold to nickel by the TEM-EDS analysis are detected within ±30% of the mole ratios of gold to nickel obtained by the ICP analysis result, and thus, this condition is fulfilled. In the present invention, the term "homogeneous gold-nickel alloy" means that this alloy is the gold-nickel alloy having the intended ratio of gold to nickel in the gold-nickel alloy; specifically, in a single gold-nickel alloy nanoparticle, the ratio of gold to nickel (mole ratio) obtained by the EDS analysis is within ±30% of the ratio of gold to nickel (mole ratio) obtained by the ICP analysis result, wherein the same results are obtained in plural gold-nickel alloy nanoparticles. And, the above-mentioned "homogeneous gold-nickel alloy" is the gold-nickel alloy in which gold and nickel are mixed homogeneously together.

Analysis as described above in the present invention, it is preferable to be carried out in the range of diameter of 50 nm or less. In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis. In addition, as the observation condition of TEM or STEM, the magnifications of them are preferably 250,000 or more, or more preferably 500,000 or more.

As to the EDS analysis method, determination of the analysis site is not particularly restricted regardless of whether it is single site or plural sites; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle.

The number of the EDS analysis sites is not particularly restricted; however, it is preferably 3 sites or more, more preferably 10 sites or more, or still more preferably 25 sites or more.

In the present invention, as the result of analysis of the gold-nickel alloy nanoparticle within the extremely small area by the afore-mentioned beam diameters using the TEM-EDS analysis or the STEM-EDS analysis, in 50% or more, preferably in 65% or more, or more preferably 80% or more of plural sites of the analysis points, the mole ratios of gold to nickel are detected within ±30%, preferably within ±20%, or more preferably within ±10% of the mole ratios of gold to nickel obtained by the ICP analysis result.

However, if the mole ratios exceed the range within ±30% of the mole ratios of gold to nickel obtained by the ICP analysis result in 50% or more of the analysis points, the mole ratios of gold to nickel in the analysis results of the extremely small area obtained by the TEM-EDS analysis or the STEM-EDS analysis are significantly different from the mole ratios of gold to nickel obtained by the ICP analysis result; and thus, there is a possibility that the uniform gold-nickel alloy nanoparticles may not be obtained.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.); and as the energy dispersive X-ray spectroscopy under observation with the scanning transmission electron microscope (STEM-EDS), the high resolution transmission electron microscope Titan 80-300 (manufactured by FEI Company) equipped with the r-TEM EDS detector (manufactured by AMETEK, Inc.), and the atomic resolution analytical electron microscope JEM-ARM 200F (UHR) (manufactured by JEOL Ltd.) equipped with the energy dispersive X-ray analyzer Centurio (manufactured by JEOL Ltd.).

Ratio of Gold to Nickel:

The ratio of gold to nickel (mole ratio) contained in the gold-nickel alloy nanoparticle of the present invention is not particularly restricted. Both the gold-nickel alloy having higher mole ratio of gold and the gold-nickel alloy having higher mole ratio of nickel may be used. Meanwhile, in the present invention, regardless of mole ratio of gold to nickel contained in the gold-nickel alloy nanoparticle, all the alloys comprising gold and nickel are described as the gold-nickel alloy, and then the nanoparticle of gold-nickel alloy is described as the gold-nickel alloy nanoparticle.

Nanoparticle Diameter of Gold-Nickel Alloy:

In the gold-nickel alloy nanoparticle of the present invention, as mentioned above, the gold-nickel alloy nanoparticle having particle diameter of 500 nm or less is preferable. More preferable is the gold-nickel alloy nanoparticle having particle diameter of 100 nm or less; and still more preferable is the gold-nickel alloy nanoparticle having particle diameter of 50 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the gold-nickel alloys of the present invention including those gold-nickel alloys shown in respective drawings, the particle diameters thereof were 500 nm or less in the obtained gold-nickel alloy; and there existed even the gold-nickel alloy nanoparticles having the particle diameters of 100 nm or less as well as 50 nm or less.

As is the case with many other alloys, the gold-nickel alloy nanoparticle of the present invention may contain minute amount of impurities in a certain instance; and thus, in the present invention of the gold-nickel alloy nanoparticle may contain intentionally or unintentionally an element other than gold or nickel. The element that can be intentionally contained therein may be exemplified by tin element. It is not particularly restricted to intentionally contain the element, and thus all elements may be mentioned, while illustrative example thereof includes gold, palladium, nickel, chromium, manganese, vanadium, iron, molybdenum, tin, and cobalt. If other metals are thought to be contained therein unintentionally as impurities, the ratio thereof is, though not particularly restricted, preferably less than 0.05% by weight, more preferably less than 0.02% by weight, or still more preferably less than 0.01%, relative to entirety of the gold-nickel alloy.

Production Method 1 of Gold-Nickel Alloy Nanoparticle: Overview

Method for producing the above-mentioned gold-nickel alloy nanoparticle is not particularly restricted. Any of the method involving pyrolysis of a gold and a nickel compound and the method involving reduction of a gold and a nickel ion may be used; however, the production method of the gold-nickel alloy nanoparticle in which a fluid which contains a gold ion and a nickel ion is mixed with a fluid which contains a reducing agent thereby separating the gold-nickel alloy nanoparticle is preferable. Alternatively, the production method of the gold-nickel alloy nanoparticle in which a fluid which contains a gold ion, a fluid which contains a nickel ion, and a fluid which contains a reducing agent are mixed to separate nanoparticles of the gold-nickel alloy nanoparticle may also be used. As the fluid which contains the reducing agent, two fluids comprising a first reducing fluid which contains at least one reducing agent and a second reducing fluid which contains at least one reducing agent other than the reducing agent used in the first reducing fluid may be used.

Production Method 2 of Gold-Nickel Alloy Nanoparticle: A Fluid which Contains a Gold Ion and a Nickel Ion, and a Fluid which Contains a Gold Ion and a Fluid which Contains a Nickel Ion The fluid which contains a gold ion and a nickel ion, or the fluid which contains a gold ion and the fluid which contains a nickel ion are not particularly restricted; however, a solution containing a gold ion and a nickel ion, or a solution containing a gold ion and a solution containing a nickel ion are preferable. Illustrative example of the method to prepare them includes a method in which metal single body such as gold or nickel is dissolved in hydrochloric acid, nitric acid, aqua regia, or the like, and a method in which a gold or a nickel compound is dissolved in a solvent. In addition, the fluid which contains a gold ion and a nickel ion may be obtained by dissolving a gold single body and/or a gold compound and a nickel single body and/or a nickel compound in a solvent all at once, or the fluid which contains a gold ion and a nickel ion may be obtained by mixing a gold solution obtained by dissolving a gold single body and/or a gold compound in a solvent with a nickel solution obtained by dissolving a nickel single body and/or a nickel compound in a solvent.

Compounds:

There are no restrictions as to the gold compound or the nickel compound; and illustrative example thereof includes gold or nickel in the form of salts, oxides, nitrides, carbides, complexes, organic salts, organic complexes, and organic compounds. There are no restrictions as to the gold salt or the nickel salt; and illustrative example thereof includes nitrate salts, nitrite salts, sulfate salts, sulfite salts, formate salts, acetate salts, phosphate salts, phosphite salts, phosphinate salts, chlorides, oxy salts, and acetyl acetonato salts. Illustrative example of the other compounds includes gold alkoxides and nickel alkoxides.

Solvents:

The fluid which contains a gold ion and a nickel ion, or the fluid which contains a gold ion and the fluid which contains a nickel ion may be prepared by mixing the gold single body and/or the gold compound and/or the nickel single body and/or the nickel compound with a solvent, or preferably by dissolving or molecular-dispersing these substances in a solvent. In addition, the gold single body and/or the gold compound and/or the nickel single body and/or the nickel compound may be carried out by selecting single body or plural bodies from them in accordance with an intended purpose. As the solvent to dissolve the gold single body and/or the gold compound and/or the nickel single body and/or the nickel compound, water, an organic solvent, or a mixture of them may be exemplified.

Illustrative example of the water includes a tap water, an ion-exchanged water, a purified water, a ultrapurified water, and a RO water; and illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxid compound solvent, a halogen compound solvent, an ester compound solvent, an ionic liquid, a carboxylic acid compound, and a sulfonic acid compound. These solvents each may be used solely or as a mixture of two or more of them.

Alternatively, a basic substance or an acidic substance may be used by mixing it with or dissolving it into the forgoing solvents Illustrative example of the basic substance includes metal hydroxides such as sodium hydroxide and potassium hydroxide, metal alkoxides such as sodium methoxide and sodium isopropoxide, and amine compounds such as triethylamine, 2-diethylaminoethanol, and diethylamine. Illustrative example of the acidic substance includes inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, and trichloroacetic acid. These basic substances or acidic substances may be respectively used solely or as a mixture with the solvents mentioned before.

Detailed Explanation of Solvents:

To explain the solvents mentioned above in more detail, illustrative example of the alcohol compound solvent includes methanol, ethanol, isopropanol, n-propanol, 1-methoxy-2-propanol, a linear alcohol such as n-butanol; branched alcohols such as 2-butanol and tert-butanol; polyalcohols such as ethylene glycol and diethylene glycol; and propylene glycol monomethyl ether. Illustrative example of the ketone compound solvent includes acetone, methyl ethyl ketone, and cyclohexanone. Illustrative example of the ether compound solvent includes dimethyl ether, diethyl ether, and tetrahydrofurane. Illustrative example of the aromatic compound solvent includes benzene, toluene, xylene, nitrobenzene, chlorobenzene, and dichlorobenzene. Illustrative example of the aliphatic compound solvent includes hexane. Illustrative example of the nitrile compound solvent includes acetonitrile. Illustrative example of the sulfoxide compound solvent includes dimethyl sulfoxide, diethylsulfoxide, hexamethylenesulfoxide, and sulfolane. Illustrative example of the halogen compound solvent includes chloroform, dichloromethane, trichloroethylene, and iodoform. Illustrative example of the ester compound solvent includes ethyl acetate, butyl acetate, methyl lactate, ethyl lactate, and 2-(1-methoxyl)propyl acetate. Illustrative example of the ionic liquid includes a salt between 1-butyl-3-methylimidazolium and $PF_6^-$ (hexafluorophosphate ion). Illustrative example of the amide compound solvent includes N,N-dimethylformamide, 1-methyl-2-pyrrolidone, 2-pyrrolidinone, 1,3-dimethyl-2-imidazolidinone, epsilon-caprolactam, formamide, N-methylformamide, acetamide, N-methylacetamide, N,N-dimetnylacetamide, N-methylpropanamide, and hexamethylphosphoric triamide. Illustrative example of the carboxylic acid compound includes 2,2-dichloropropionic acid and squaric acid. Illustrative example of the sulfonic acid compound includes methanesulfonic acid, p-toluenesulfonic acid, chlorosulfonic acid, and trifluoromethanesulfonic acid.

Reducing Agents:

Meanwhile, the reducing agents are somewhat different from the above, so that the entirety thereof is shown below.

There is no particular restriction as to the reducing agent, so that any reducing agents capable of reducing a gold ion and/or a nickel ion may be used. Illustrative example thereof includes hydride reducing agents such as sodium borohydride and lithium borohydride; aldehydes such as formalin and acetaldehyde; sulfite salts; carboxylic acids and lactones such as formic acid, citric acid, oxalic acid, succinic acid, ascorbic acid; aliphatic monoalcohols such as methanol, ethanol, butanol, isopropyl alcohol, and octanol; alicyclic alcohol such as terpineol; aliphatic diols such as ethylene glycol, propylene glycol, diethylene glycol, dipropylene glycol, triethylene glycol, and tetraethylene glycol; polyalcohols such as glycerin and trimethylolpropane; polyethers such as polyethylene glycol and polypropylene glycol; alkanol amines such as diethanol amine and monoethanol amine; and hydroquinone, resorcinol, aminophenol, glucose, sodium citrate, hypochlorous acid or its salts, transition metal ions (such as titanium ion and iron ion), hydrazines, and amines such as triethylamine, triethanolamine, diethylamino ethanol, octylamune, and dimethylaminoborane; pyrrolidone (such as polyvinyl pyrrolidone, 1-vinylpyrrolidone, N-vinylpyrrolidone, and methylpyrrolidone).

Reducing Agents: Hydrazines

In the present invention, at least one reducing agent selected from the above-mentioned reducing agents is used. If two or more reducing agents selected from the above-mentioned reducing agents are used, it may be possible to control the reducing rates of gold and nickel, or the separating times of gold and nickel. It is preferable to use a hydrazine as the reducing agent. Illustrative example of the hydrazine includes hydrazine, hydrazine monohydrate, hydrazinium carbonate, hydrazinium sulfate, phenyl hydrazine, 1-methyl-1-phenylhydrazine, and 1,1-diphenyl hydrazine hydrochloride salt.

By using two or more reducing agents, as mentioned above, it may be possible to control the reducing rates of gold and nickel, or the separating times of gold and nickel. The mechanism as to how it works cannot be particularly restricted; however, it is thought that if an attempt is made to reduce gold and nickel which have different characteristics with each other, especially gold and nickel which have different standard electrode potentials ($Ni^{2+}+2e \Leftrightarrow Ni$: $-0.228 E°/V$, and $Au^{+}+e \Leftrightarrow Au$: $+1.68 E°/V$, or $[AuCl_4]^- + 3e \Leftrightarrow Au+4Cl^-$:$1.002 E°/V$, or $[AuCl_2]^- + e \Leftrightarrow Au+2Cl^-$:$1.154 E°/V$), by a single reducing agent, nobler and more readily reducible gold tends to be reduced and separated faster than nickel thereby tending to separate out as the gold single body and the nickel single body respectively, or as an inhomogeneous alloy; however, if two or more reducing agents are used, facilitation of the rates of reduction and separation of nickel, or retardation of the rates of reduction and separation of gold, or both of them may occur to give rise the effect to simultaneous separation of gold and nickel.

As mentioned above, of these reducing agents one reducing agent may be used; however, it is advantageous if at least two reducing agents selected from these reducing agents are used because a gold ion and a nickel ion to constitute the alloy may be reduced almost simultaneously.

Among the above-mentioned reducing agents, monoalcohols (such as methanol, ethanol, butanol, isopropyl alcohol, octanol, and terpineol), aliphatic diols (such as ethylene glycol, propylene glycol, diethylene glycol, dipropylene glycol, triethylene glycol, and tetraethylene glycol), and polyvalent alcohol (such as glycerin and trimethylol propane) may be used also as an solvent; and thus, they may be used together with other reducing agent. Further, among the above-mentioned reducing agents, pyrrolidones (polyvinyl pyrrolidone, 1-vinyl pyrrolidone, N-vinyl pyrrolidone, and methyl pyrrolidone) as well as amines (especially octylamine) can act also as a dispersant; and thus, they may be used together with other reducing agent. As seen above, a reducing agent may be used together with a substance having a reducing property while being able to play other role, so that the reduction may be controlled so as to reduce a gold ion and a nickel ion almost simultaneously. In this case, the substance having a reducing property that can act as a solvent or as a dispersant may be blended not only in the fluid which contains a reducing agent but also in the fluid which contains a gold ion and a nickel ion, in the fluid which contains a gold ion, or in the fluid which contains a nickel ion.

Fluid which Contains Reducing Agent:

The fluid which contains a reducing agent contains preferably reducing agent mentioned above; and in addition, the reducing agent is preferably in the state of solution, or in the state of being dissolved or molecular dispersed by mixing with a solvent. There is no particular restriction as to the solvent. The solvents mentioned before may be used in accordance with the purpose. The fluid which contains the reducing agent may include the states such as dispersion solution and slurry solution at the time of execution thereof.

In addition, as the fluid which contains a reducing agent, as mentioned above, a fluid which contains at least two reducing agents may be used, or alternatively, as a fluid containing the reducing agent, two fluids comprising a first fluid which contains at least one reducing agent and a second fluid which contains at least one reducing agent that is different from the reducing agent used in the first fluid may also be used.

As to pH: The Fluid which Contains Gold and Nickel Ions or the Fluid which Contains Gold Ion and the Fluid which Contains Nickel Ion, the Fluid which Contains Reducing Agent, and the Fluid after Mixing In the present invention, pH of each of the fluids is not particularly restricted. It can be arbitrarily changed in accordance with mole ratio of gold and nickel, particle diameter, crystallinity, and so force in the intended gold-nickel alloy nanoparticle. For example, adjustment of pH of the fluid which contains gold and nickel or the fluid which contains gold and the fluid which contains nickel, and the fluid which contains a reducing agent may be executed by adding the afore-mentioned acidic substance or basic substance to the respective fluids; or pH may be changed by gold and nickel, compound of them, or the reducing agent to be used, or by the respective concentrations. Further, pH of the fluid after separation of the gold-nickel alloy nanoparticle, the said fluid being obtained by mixing a fluid which contains a reducing agent with a fluid which contains a gold ion and a nickel ion, or with a fluid which contains a gold ion and a fluid which contains a nickel ion, is not particularly restricted.

Temperature:

There is no particular restriction as to the temperature of each of the fluids of the present invention. Similarly to pH of each fluid of the present invention, the respective temperatures can be arbitrarily changed in accordance with mole ratio of gold and nickel, particle diameter, crystallinity, and so force in the intended gold-nickel alloy nanoparticles.

Dispersant and so Forth:

In the present invention, various dispersing agents and surfactants may be used in accordance with the object and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various kinds of polymers. These may be used singly or as a combination of two or more of them. Among the dispersants, some of them have a reducing property; and as the example of it, polyvinylpyrrolidone and n-octylamine may be mentioned.

The afore-mentioned surfactant and dispersant may be contained in the fluid which contains a gold ion and a nickel ion, in the fluid which contains a gold ion and in the fluid which contains a nickel ion, in the fluid which contains a reducing agent, or in both of these fluids. Alternatively, the afore-mentioned surfactant and dispersant may be contained in a third fluid which is different from the fluid which contains a gold ion and a nickel ion, the fluid which contains a gold ion, the fluid which contains a nickel ion, and the fluid which contains a reducing agent. Especially in order to improve dispersibility, it is preferable that the dispersant etc. be introduced in advance into at least any one of the fluid which contains a reducing agent, the fluid which contains a gold ion and a nickel ion, the fluid which contains a gold ion, and the fluid which contains a nickel ion.

Fluid Processing Apparatus:

In the present invention, it is preferable that the fluid which contains the gold and nickel ions be mixed with the fluid which contains a reducing agent in a thin film fluid formed between processing surfaces which are disposed in a position they are faced with each other so as to be able to approach to and separate from each other, at least one of which rotates relative to the other, whereby separating the gold-nickel alloy nanoparticles; and it is preferable that the mixing be carried out by using the fluid-processing apparatus described in Patent Document 3 and 4 filed by the present applicant to separate the gold-nickel alloy nanoparticles. Hereunder, embodiments of the fluid processing apparatus will be explained by using the drawings.

In conventional production methods, there were tendencies to form a go which gold-nickel alloy nanoparticle contains a mixture of a eutectic body of gold and nickel and a solid solution of gold and nickel; however, in the present invention, by using the fluid processing apparatus shown below and by obtaining the mixed state of the specific region of the solid phase, it became possible to obtain the gold-nickel alloy nanoparticle mainly comprising the non-eutectic body structure not containing the eutectic body of gold and nickel which is made so as to show the finely mixed state of gold and nickel in the level of nanometers. Applicant of the present invention considers the reason for this as following: because the reducing reactions of gold and nickel could be controlled in an atomic level, gold and nickel could realize a homogeneous mixing state thereof in an atomic level.

However, preparation of the gold-nickel alloy nanoparticle by the fluid processing apparatus discussed later represents one example, so that any method may be used provided that the reducing reactions of gold and nickel can be controlled in an atomic level.

Explanation of Fluid Processing Apparatus

Figure 2:
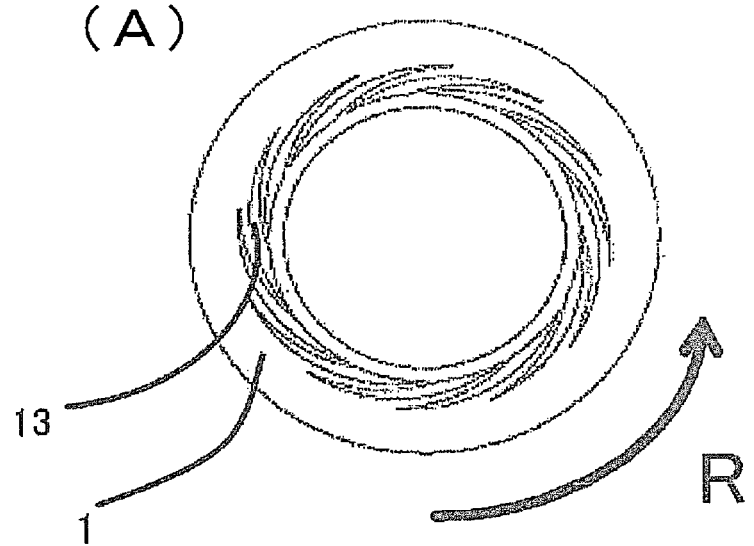
Figure 2:
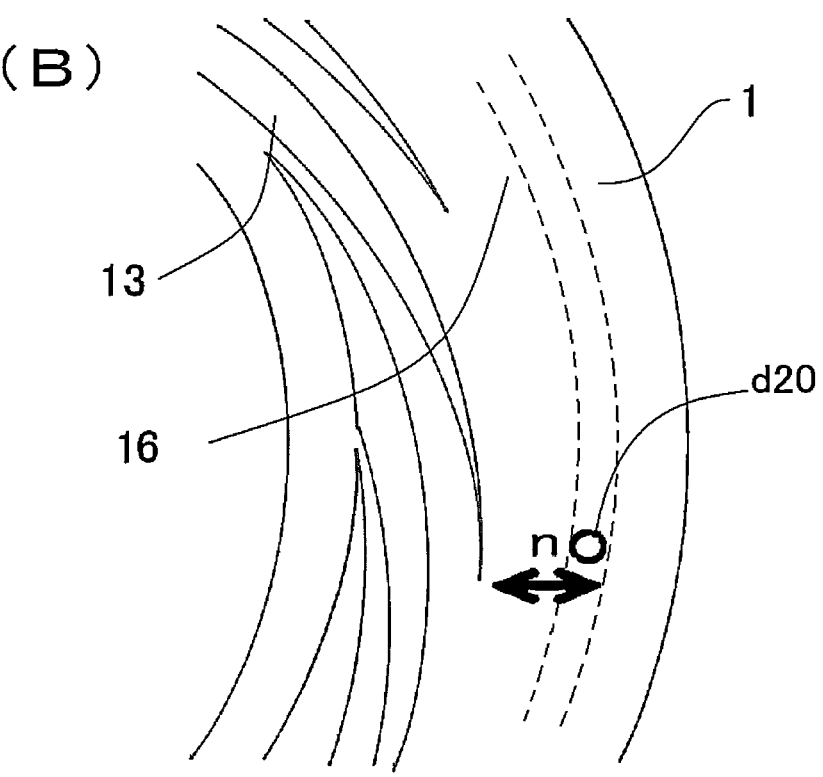
Figure 3:
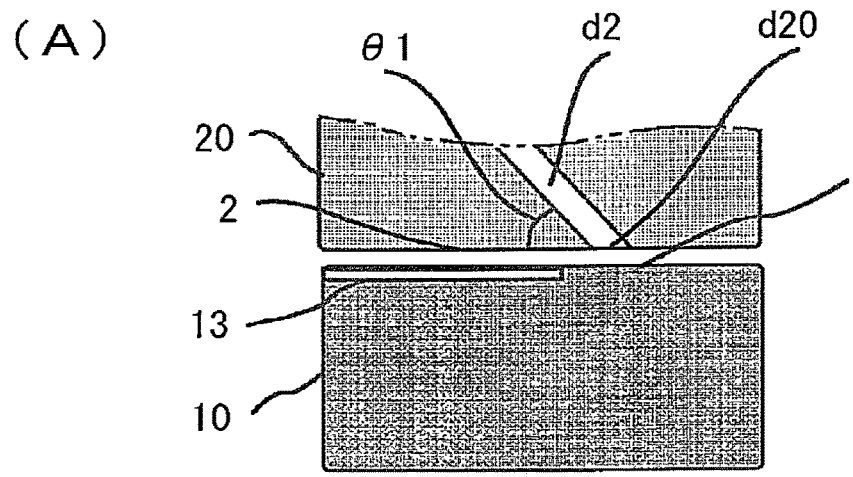
Figure 3:
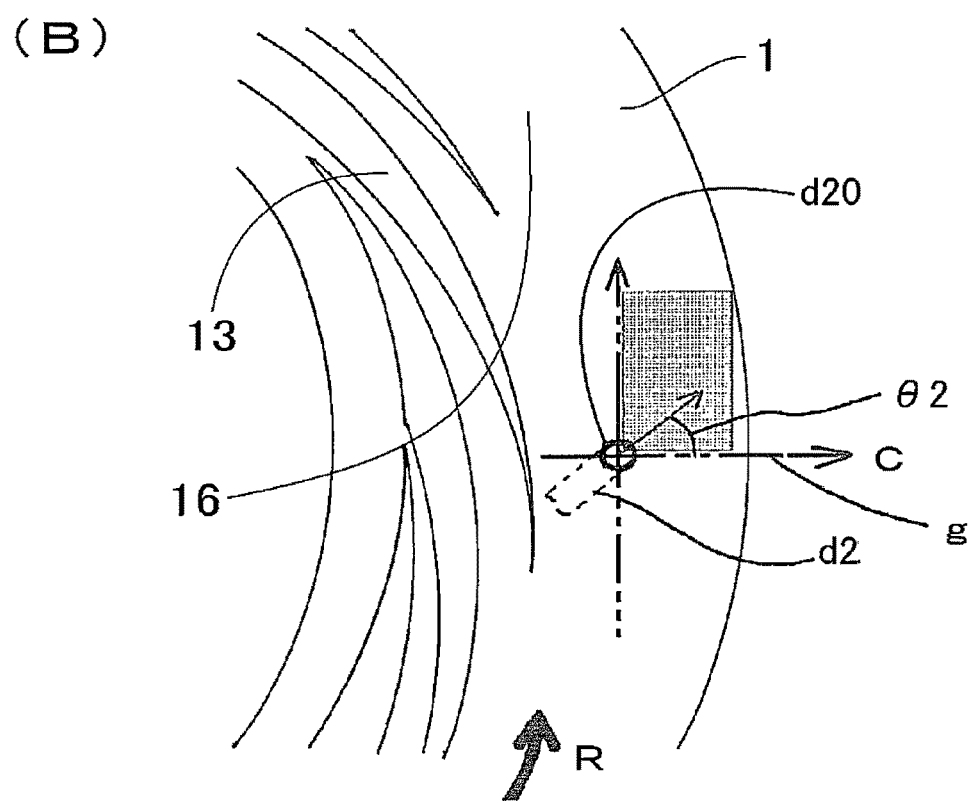

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also carbon, ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 10 and 20.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. The shape of the opening part d20 may be circular as shown by solid lines in FIG. 2(B) and FIG. 3(B), or a concentric circular ring of annular shape surrounding the opening in the center of the processing surface 2 having the ring disk shape as shown by dotted lines in FIG. 2(B).

If the opening part d20 having an annular shape is arranged so as to be concentric circular ring surrounding the opening in the center of the processing surface 2, the second fluid to be introduced into between the processing surfaces 1 and 2 can be introduced to a wide range in the circumferential direction with the same condition; and thus, the fluid processing, including diffusion, reaction, and separation, can be done more uniformly. In order to produce large quantities of fine particles, the opening part d20 is preferably in the shape of annular shape, while it is not necessary that the opening part d20 having an annular shape be arranged so as to be concentric circular ring surrounding the opening in the center of the processing surface 2. If the opening part having the annular shape is used, the said opening part having the annular shape may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

In the above-mentioned apparatus, a treatment such as separation/precipitation and crystallization is effected while being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, one example of specific embodiment of the production method of the gold-nickel alloy nanoparticles by using the above-mentioned apparatus will be explained.

The separation reaction of the gold-nickel alloy nanoparticles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains at least the gold ion and nickel ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the gold-nickel alloy nanoparticle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

During the time of separating the gold-nickel alloy nanoparticles by carrying out the reaction between the processing surfaces 1 and 2, the first fluid and the second fluid are controlled such that concentration of nickel contained in the gold-nickel alloy nanoparticle may become 2.0% or more by weight and less than 92.7% by weight.

During the time of separating the gold-nickel alloy nanoparticles by mixing a fluid which contains a gold ion and an nickel ion with a fluid which contains a reducing agent, respective concentrations in the fluid which contains the gold ion and the nickel ion in the fluid which contains the reducing agent are not particularly restricted; however, concentration of the gold ion in the fluid which contains the gold ion and the nickel ion is preferably in the range of 0.001 to 1.5000M (mol/L), concentration of the gold ion in the fluid which contains the gold ion and the nickel ion is preferably in the range of 0.0010 to 1.5000 M (mol/L), and concentration of the reducing agent in the fluid which contains the reducing agent is preferably in the range of 0.0001 to 25.000M (mol/L), though these are different depending on the compounds to be used and the like.

By using the apparatus shown above, the gold-nickel alloy having fine crystalline particles with fewer lattice defects can be produced; and thus, it is also advantageous that the gold-nickel alloy nanoparticles showing the expected characteristics can be obtained.

Meanwhile, in observation by the electron microscope (TEM and STEM) of respective Examples of the present invention, clear lattice defects were not confirmed.

It is thought that the homogeneous solid solution with the concentration not achievable before in the Gold-nickel alloy could be obtained because it is possible to mix and react them homogeneously in an atomic level by using the apparatus discussed above.

As mentioned before, the processing apparatus may be provided with, in addition to the first introduction part d1 and the second introduction part d2, the third introduction part d3; and in this case, for example, each of the fluids which contains a gold ion as the first fluid, the fluid which contains an nickel ion as the second, and the fluid which contains a reducing agent as the third may be introduced into the apparatus. By so doing, concentration and pressure of each fluid can be controlled separately so that the separation reaction of the gold-nickel alloy nanoparticles may be controlled more precisely. Similarly, the processing apparatus may be provided with, in addition to the first introduction part d1, the second introduction part d2, the third introduction part d3, and in this case, for example, the fluid which contains a gold ion and an nickel ion as the first fluid, the first reducing fluid which contains at least one reducing agent as the second fluid, and the second reducing fluid which contains at least one reducing agent different from the reducing agent used in the first reducing fluid as the third fluid may be respectively introduced into the apparatus. Meanwhile, a combination of the fluids to be processed (first to third fluids) that are introduced into the respective introduction parts may be set arbitrarily. The same is applied if the forth or more introduction parts are arranged; and by so doing, fluids to be introduced into the processing apparatus may be subdivided. In this case, it is preferable that the fluid which contains a gold ion and the fluid which contains an nickel ion be joined together before joining with the fluid which contains a reducing agent; and it is also preferable that the first reducing fluid and the second reducing fluid be joined together before joining with the fluid which contains a gold ion and an nickel ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Hereunder, the present invention will be explained more specifically. However, the present invention is not limited to them.

Meanwhile, in the following Examples, the term "from the center" means "from the first introduction part d1" of the processing apparatus shown in FIG. 1; the first fluid means the first fluid to be processed which is introduced from the first introduction part d1; and the second fluid means the second fluid to be processed which is introduced from the second introduction part d2 of the processing apparatus shown in FIG. 1.

TEM-EDS Analysis:

The quantitative analyses of gold and nickel in the gold-nickel alloy nanoparticles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of gold to nickel in the gold-nickel alloy nanoparticles. Specifically, 5 analysis points shown in FIG. 7 were chosen in each of 10 of the obtained gold-nickel alloy nanoparticle; and mole ratios of gold to nickel at respective analysis points were calculated, from which values the average value was used.

Specific conditions of the TEM observation and the TEM-EDS analysis were as follows; a sample of the gold-nickel alloy nanoparticles was mounted on the transmission electron microscope at room temperature, and an electron beam was irradiated to the sample of the gold-nickel alloy nanoparticles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the gold-nickel alloy nanoparticles.

Meanwhile, the acceleration voltage of the electron beam to irradiate the gold-nickel alloy nanoparticles can be set arbitrarily to approximately several hundred kV by the used transmission electron microscope.

STEM-EDS Analysis:

The element mapping and the quantitative analyses of gold and nickel in the gold-nickel alloy nanoparticles by STEM-EDS were carried out by the ultra-high resolution transmission electron microscope TITAN 80-300 (manufactured by FEI company) equipped with the γ-TEM EDS detector (manufactured by Ametek Inc.), and the atomic resolution analytical electron microscope JEM-ARM200F (UHR) (manufactured by JEOL Ltd.) equipped with the energy dispersive X-ray analyzer Centurio (manufactured by JEOL Ltd.). The analysis was done by using the beam diameter of 0.2 nm to calculate the mole ratio of gold to nickel in the gold-nickel alloy nanoparticles. Specifically, 4 analysis points shown in FIG. 6 were chosen in each of 10 of the obtained gold-nickel alloy nanoparticles; and mole ratios of gold to nickel at respective analysis points were calculated, from which values the average value was used.

Specific conditions of the STEM observation, the TEM observation, and the STEM-EDS analysis were as follows; a sample of the gold-nickel alloy nanoparticles was mounted on the scanning transmission electron microscope at room temperature, and an electron beam was irradiated to the sample of the gold-nickel alloy nanoparticles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the gold-nickel alloy nanoparticles.

Meanwhile, the acceleration voltage of the electron beam to irradiate the gold-nickel alloy nanoparticles can be set arbitrarily to approximately several hundred kV by the used electron microscopes.

ICP Analysis:

Quantitative analyses of gold and nickel contained in the dried powders of the gold-nickel alloy nanoparticles by the inductively coupled plasma atomic emission spectrophotometry (ICP) were carried out by using ICPS-8100 (manufactured by Shimadzu Corp.).

As Examples 1 to 6, while the fluid which contained a gold ion and a nickel ion was introduced as the first fluid from the center with the supply pressure of 0.50 MPaG, the fluid which contained a reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the gold-nickel alloy nanoparticles was discharged from between the processing surfaces 1 and 2. The discharged dispersion solution of the gold-nickel alloy nanoparticles was treated by a centrifugal separator (20,000 G) to spin down the gold-nickel alloy nanoparticles. After the supernatant solution thereof was removed, washing by methanol was repeated for three times; and then, the wet cake thus obtained was dried under air pressure at 25° C. to obtain dried powders of the gold-nickel alloy nanoparticles. Confirmation of the particle diameter of the gold-nickel alloy nanoparticles was done by using the TEM observation; and judgment thereof was done by the particle diameter of the primary particle thereof. The TEM measurements were done with the magnification of 50,000 or more; and the minimum and maximum value of 3 spots were used.

In Table 1, processing conditions of the first fluid are shown; and in Table 2, processing conditions of the second fluid are shown. In Table 3, shown are rotation number of the processing surface 1, the ratio of gold to nickel (mole ratio) obtained by the STEM-EDS analysis and the TEM-EDS analysis of the gold-nickel alloy nanoparticles, the ratio of gold to nickel in the STEM-EDS analysis and the TEM-EDS analysis of the gold-nickel alloy nanoparticles, whether or not there was an analysis point at which the ratio of gold to nickel was in α or β (in Table 3, this point is shown as measurement point), the ratio of gold to nickel (mole ratio) in the gold-nickel alloy nanoparticles by the ICP analysis result which was done by using dried powders of the gold-nickel alloy nanoparticles, and the nickel concentration (% by weight) contained in the gold-nickel alloy. The abbreviations used in Table 1 and 2 and in Table 13 are as follows: EG; ethylene glycol, $HAuCl_4.4H_2O$; chloroauric acid tetrahydrate, $NiCl_2.6H_2O$; nickel chloride hexahydrate, HMH; hydrazine monohydrate, PVP; polyvinyl pyrrolidone, KOH; potassium hydroxide, and PW; pure water.

As Comparative Examples 1 to 3, mixing of the first fluid and the second fluid was carried out by using a beaker. Each of the same fluids which contained the gold ion and nickel ion as those of Examples 1 to 3 (in Example 3 and comparative Example 3, only the concentration of nickel chloride hexahydrate is different.) at 130° C. was added with stirring into each of the same fluid which contained the reducing agent as those of Examples 1 to 3 at 20° C. in a beaker to mix them. The particles respectively obtained by the same procedures as those of Examples C1 to C3 were recovered; and they were subjected to the STEM-EDS analysis, the TEM-EDS analysis, and the ICP analysis.

From the results of the TEM-EDS analysis and the STEM-EDS analysis in all the analysis points, it was confirmed that the gold-nickel alloy nanoparticles obtained in these Examples were the gold-nickel alloy nanoparticles whose nickel concentrations contained in the gold-nickel alloy were in the range of 2.0 to 92.7% by weight (all were in the α+β region of the Au—Ni alloy equilibrium diagram). In addition, there was no analysis point detected at which the ratio of gold to nickel (mole ratio) in the gold-nickel alloy nanoparticles obtained by these Examples was the ratio of gold to nickel (mole ratio) in α or β, respectively.

Figure 10:
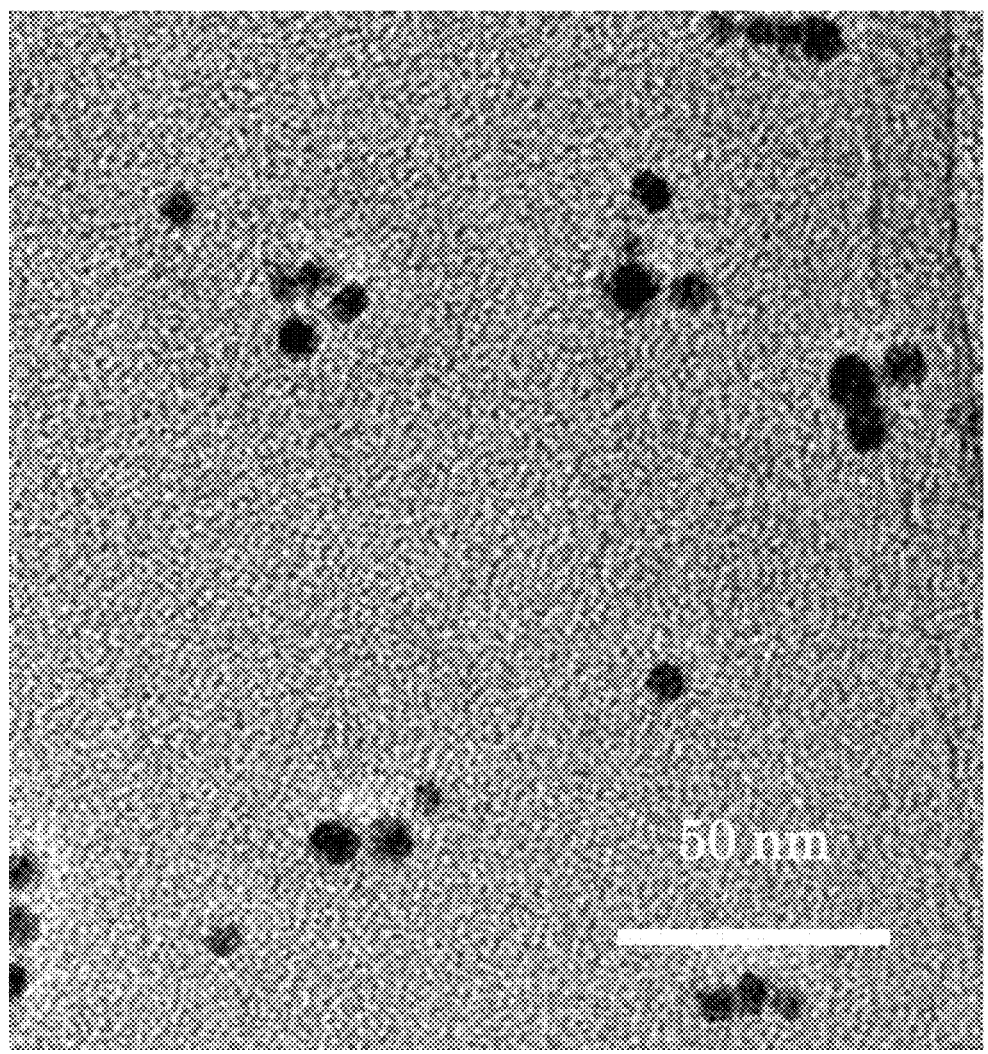

In FIG. 5, the TEM picture of the gold-nickel alloy nanoparticle obtained by Example 1 is shown; in FIG. 6, the STEM picture of the gold-nickel alloy nanoparticle obtained by Example 2 is shown; and in FIG. 7, the TEM picture of the gold-nickel alloy nanoparticle obtained by Example 3 is shown. In FIG. 10, the TEM picture of the gold-nickel alloy nanoparticles obtained by Example 1 with a lower magnification is shown. As shown in FIG. 5 to FIG. 7, the clear state in which gold and nickel each is segregated was not confirmed in the gold-nickel alloy nanoparticles obtained by these Examples.

Figure 11:
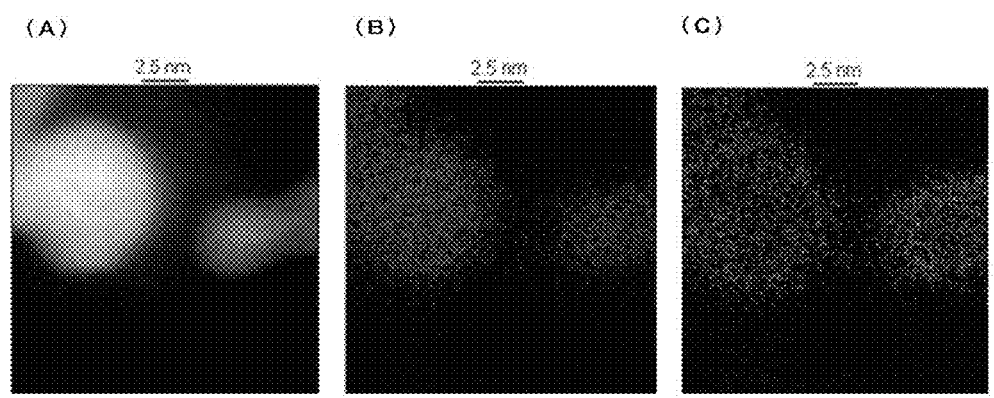

In FIG. 11, the STEM-HAADF picture (A) and the EDS mapping results of the gold-nickel alloy nanoparticles obtained in Example 5 are shown ((B); Au, and (C); Ni). In the analysis using the EDS mapping, a state such as the clear state in which gold and nickel were eccentrically separated in one particle was not found.

Figure 8:
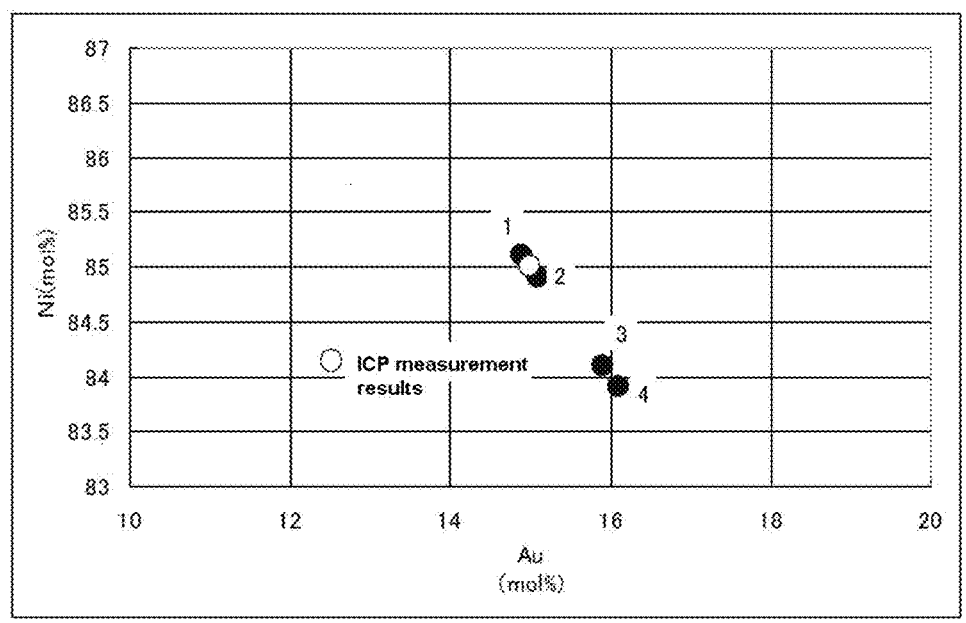

In addition, in FIG. 6, the gold-nickel alloy nanoparticle obtained in Example 2 by the STEM-EDS analysis points (4 points) by the particle diameter of 0.2 nm beam diameter, and in FIG. 8, the EDS analysis points measured at the each analysis point shown in FIG. 6 are shown. From the analysis results shown in FIG. 8, in 50% or more of the analysis points, the mole ratios of gold to nickel in the STEM-EDS analysis were detected within ±30% of the mole ratios of gold to nickel obtained by the ICP analysis result.

The EDS analysis results in FIG. 8 are one example of the gold-nickel alloy nanoparticles obtained in Example 2; and in each of 10 gold-nickel alloy nanoparticles whose EDS analyses were conducted, in 50% or more of the analysis points, the mole ratios of gold to nickel in the STEM-EDS analysis were detected within ±30% of the mole ratios of gold to nickel obtained by the ICP analysis result. In addition, as the results of the similar STEM-EDS analyses in other Examples shown in Table 3, the analysis points at which the mole ratios of the gold to nickel in the STEM-EDS analysis in some analysis points were maximum ±30% relative to the mole ratios of gold to nickel obtained by the ICP analysis of each Example were present.

Figure 9:
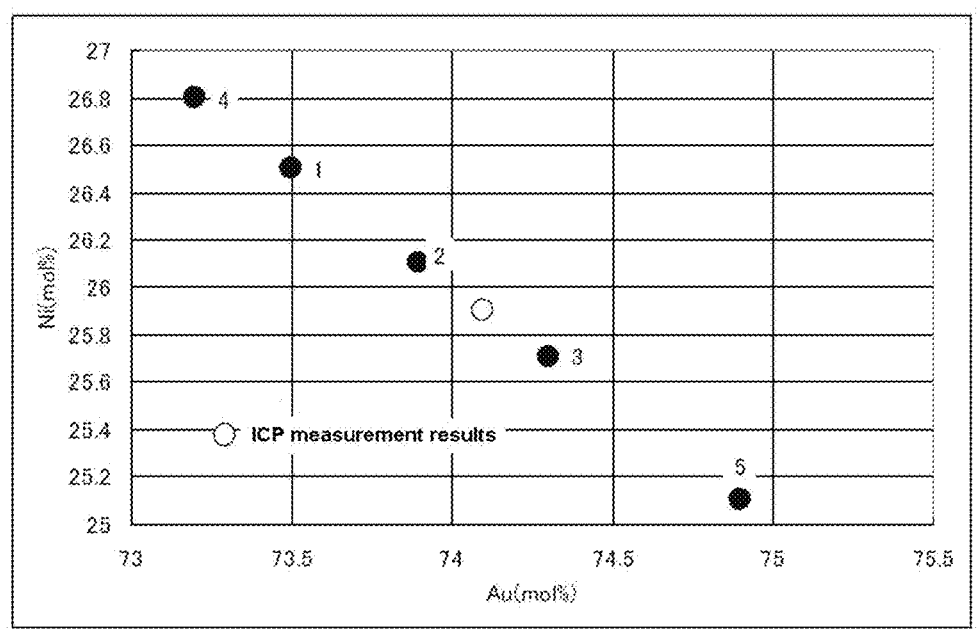

In addition, in FIG. 7, the gold-nickel alloy nanoparticle obtained in Example 3 by the TEM-EDS analysis points (5 points) by the particle diameter of 5 nm beam diameter, and in FIG. 9, the EDS analysis result measured at the each analysis point shown in FIG. 7 are shown. From the analysis results shown in FIG. 9, in 50% or more of the analysis points, the mole ratios of gold to nickel, were detected within ±30% of the mole ratios of gold to nickel obtained by the ICP analysis result.

The EDS analysis results in FIG. 9 are one example of the gold-nickel alloy nanoparticles obtained in Example 3; and in each of 10 gold-nickel alloy nanoparticles whose EDS analyses were conducted, in 50% or more of the analysis points, the mole ratios of gold to nickel in the TEM-EDS analysis were detected within ±30% of the mole ratios of gold to nickel obtained by the ICP analysis result. In addition, as the results of the similar TEM-EDS analyses in other Examples shown in Table 3, the analysis points at which the mole ratios of the gold to nickel in the TEM-EDS analysis in some analysis points were maximum ±30% relative to the mole ratios of gold to nickel obtained by the ICP analysis of each Example were present.

Figure 12:
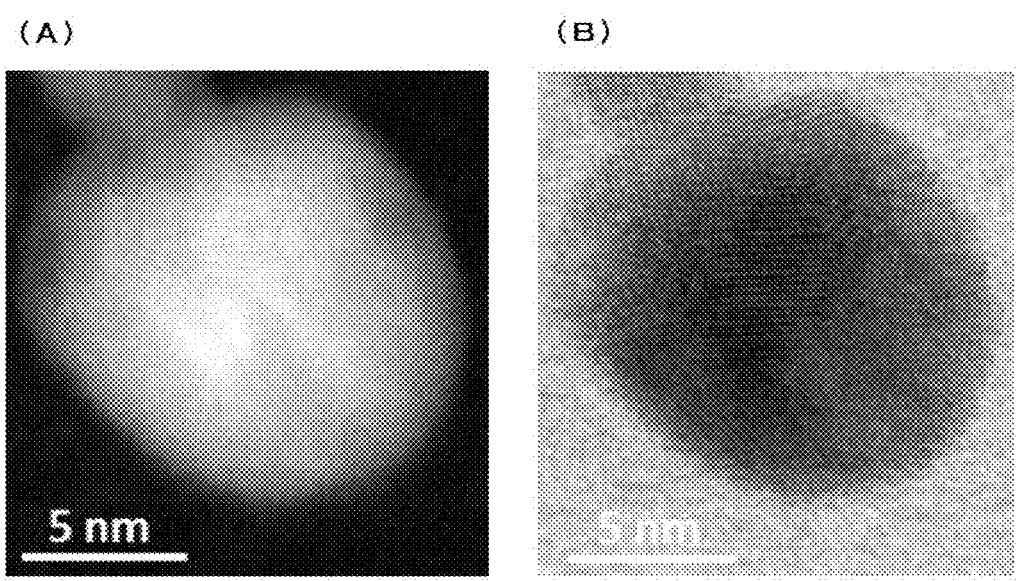
Figure 13:
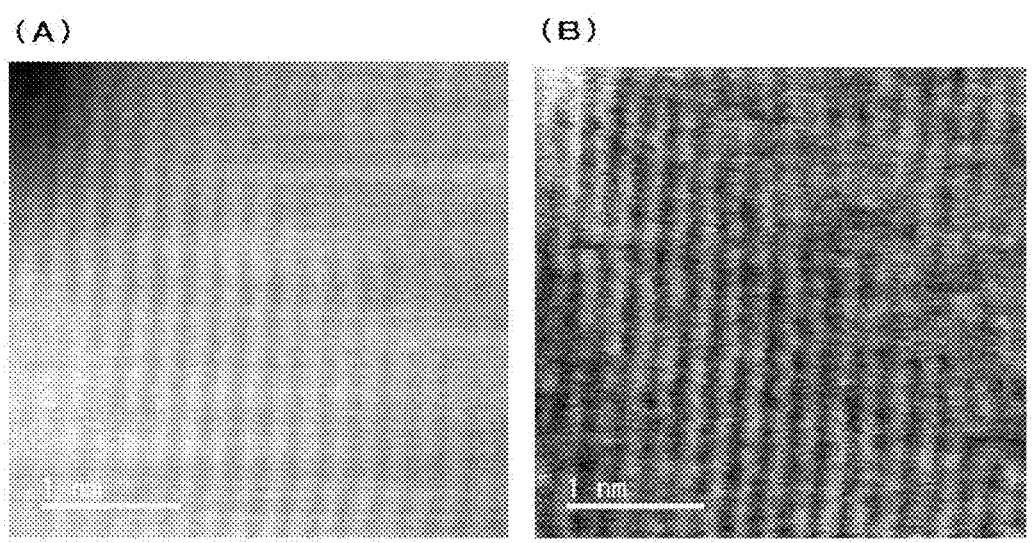

Next, in FIG. 12, the STEM pictures of the gold-nickel alloy nanoparticles obtained in Example 5 with magnification of 12 million are shown ((A) the HAADF picture (dark field), and (B) the BF picture (bright field)). As shown in FIG. 12 (A) and (B), the surged lattice fringes were observed in the gold-nickel alloy nanoparticles. In FIG. 13, the STEM pictures of the gold-nickel alloy nanoparticles obtained in Example 5 with magnification of 60 million are shown ((A) the HAADF picture (dark field), and (B) the BF picture (bright field)). In the STEM pictures as shown in FIG. 13 (A) and (B), the surged lattice fringes were confirmed in the gold-nickel alloy nanoparticles. In other Examples with regard to the gold-nickel alloy nanoparticles (Examples 1 to 4 and Example 6), the same lattice fringes were also confirmed.

In the case that each of gold and nickel forms the crystallite of its own, there appear surges occasionally due to inconsistency in the grain boundary of these crystallites; however, the surges that were observed in the gold-nickel alloy nanoparticles of Example 5 were observed inside the crystallite; and thus, it is thought that as gold and nickel formed the solid solution, the surges were generated by strain of the crystal lattice due to the difference of the atomic radius between them.

TABLE 1

| | First fluid | | | | | | |
|---|---|---|---|---|---|---|---|
| | | Mixed and dissolved substance | | | | Supply | pH |
| | Solvent | 1 | | 2 | | temperature | (pH test |
| Example | Kind | (M) | Kind | (M) | Kind | (° C.) | paper) |
| 1 | EG | 0.0075 | $HAuCl_4·4H_2O$ | 0.0075 | $NiCl_2·6H_2O$ | 130 | 2 to 3 |
| 2 | EG | 0.0017 | $HAuCl_4·4H_2O$ | 0.0096 | $NiCl_2·6H_2O$ | 130 | 2 to 3 |
| 3 | EG | 0.0075 | $HAuCl_4·4H_2O$ | 0.0026 | $NiCl_2·6H_2O$ | 130 | 2 to 3 |
| 4 | EG | 0.00024 | $HAuCl_4·4H_2O$ | 0.00936 | $NiCl_2·6H_2O$ | 130 | 2 to 3 |
| 5 | EG | 0.0024 | $HAuCl_4·4H_2O$ | 0.0008 | $NiCl_2·6H_2O$ | 130 | 2 to 3 |
| 6 | EG | 0.0016 | $HAuCl_4·4H_2O$ | 0.0189 | $NiCl_2·6H_2O$ | 130 | 2 to 3 |
| Comparative Example 1 | EG | 0.0075 | $HAuCl_4·4H_2O$ | 0.0075 | $NiCl_2·6H_2O$ | 130 | 2 to 3 |
| Comparative Example 2 | EG | 0.0017 | $HAuCl_4·4H_2O$ | 0.0096 | $NiCl_2·6H_2O$ | 130 | 2 to 3 |
| Comparative Example 3 | EG | 0.0075 | $HAuCl_4·4H_2O$ | 0.0013 | $NiCl_2·6H_2O$ | 130 | 2 to 3 |

TABLE 2

| | Second fluid | | | | | | | | | | |
|---|---|---|---|---|---|---|---|---|---|---|---|
| | Solvent | | | Mixed and dissolved substance | | | | | | | |
| | | 2 | | | 2 | | 3 | | | Supply | pH |
| | 1 | (% by | | 1 | (% by | | (% by | | | temperature | (pH test |
| Example | Kind | weight) | Name | (M) | Kind | weight) | Kind | weight) | Kind | (° C.) | paper) |
| 1 | EG | 32.3 | PW | 2.15 | HMH | 10.8 | PVP | 3.23 | KOH | 20 | >14 |
| 2 | EG | 32.3 | PW | 2.15 | HMH | 10.8 | PVP | 3.23 | KOH | 20 | >14 |
| 3 | EG | 32.3 | PW | 2.15 | HMH | 10.8 | PVP | 3.23 | KOH | 20 | >14 |
| 4 | EG | 32.3 | PW | 2.15 | HMH | 10.8 | PVP | 3.23 | KOH | 20 | >14 |

TABLE 2-continued

| | Second fluid | | | | | | | | | | |
|---|---|---|---|---|---|---|---|---|---|---|---|
| | Solvent | | | | Mixed and dissolved substance | | | | | Supply | pH |
| | 1 | 2 | | | 1 | 2 | | 3 | | temperature | (pH test |
| Example | Kind | (% by weight) | Name | (M) | Kind | (% by weight) | Kind | (% by weight) | Kind | (° C.) | paper) |
| 5 | EG | 32.3 | PW | 2.15 | HMH | 10.8 | PVP | 3.23 | KOH | 20 | >14 |
| 6 | EG | 32.3 | PW | 2.15 | HMH | 10.8 | PVP | 3.23 | KOH | 20 | >14 |
| Comparative Example 1 | EG | 32.3 | PW | 2.15 | HMH | 10.8 | PVP | 3.23 | KOH | 20 | >14 |
| Comparative Example 2 | EG | 32.3 | PW | 2.15 | HMH | 10.8 | PVP | 3.23 | KOH | 20 | >14 |
| Comparative Example 3 | EG | 32.3 | PW | 2.15 | HMH | 10.8 | PVP | 3.23 | KOH | 20 | >14 |

TABLE 3

| | | EDS | | | | | | | | |
|---|---|---|---|---|---|---|---|---|---|---|
| | Processing surface Rotation | STEM-EDS | | TEM-EDS | | Measurement point at which the ratio of | ICP | | Nickel concentration contained in | Particle |
| Example C | number (rpm) | Gold | Nickel Mole ratio | Gold | Nickel Mole ratio | gold to nickel was in α or β | Gold | Nickel Mole ratio | AuNi alloy (% by weight) | diameter (nm) |
| 1 | 1700 | 50.1 | 49.9 | 50.8 | 49.2 | No | 50.1 | 49.9 | 22.9 | 10 to 20 |
| 2 | 1700 | 14.9 | 85.1 | 15.2 | 84.8 | No | 14.9 | 85.1 | 63.0 | 5 to 10 |
| 3 | 1700 | 74.3 | 25.7 | 75.0 | 25.0 | No | 74.1 | 25.9 | 9.4 | 30 to 50 |
| 4 | 1700 | 2.7 | 97.3 | 2.6 | 97.4 | No | 2.5 | 97.5 | 92.1 | 70 to 90 |
| 5 | 1700 | 75.3 | 24.7 | 73.9 | 26.1 | No | 75.4 | 24.6 | 8.9 | 150 to 250 |
| 6 | 1700 | 7.7 | 92.3 | 7.6 | 92.4 | No | 7.8 | 92.2 | 77.9 | 480 |
| Comparative Example 1 | 1700 | 12.3 | 87.7 | 46.9 | 53.1 | Yes | 50.1 | 49.9 | 22.9 | 250-740 |
| Comparative Example 2 | 1700 | 1.3 | 98.7 | 87.6 | 12.4 | Yes | 14.1 | 85.9 | 64.5 | 480 to 960 |
| Comparative Example 3 | 1700 | 99.9 | 0.1 | 4.6 | 95.4 | Yes | 83.6 | 16.4 | 5.5 | 320 to 1120 |

From the above, in Examples 1 to 6, it was confirmed that the homogeneous gold-nickel alloy nanoparticle which was made so as to show the finely mixed state of gold and nickel in the level of nanometers, especially the substitutional solid solution alloy particle, could be obtained.

1 first processing surface
2 second processing surface
10 first processing member
11 first holder
20 second processing member
21 second holder
d1 first introduction part
d2 second introduction part
d20 opening

The invention claimed is:

1. A method for producing a gold-nickel alloy nanoparticle, which is a solid gold-nickel alloy nanoparticle, wherein as a result of microrange analysis of the solid gold-nickel alloy nanoparticle by a TEM-EDS analysis using a beam diameter of 5 nm, molar ratios of gold and nickel in 50% or more of analysis points thereof are detected within ±30% of molar ratios of gold and nickel obtained by ICP analysis result of the solid gold-nickel alloy nanoparticle,
said method comprising the steps of:
supplying at least two fluids to be processed to between processing surfaces which relatively move so as to be able to approach to and separate from each other, the two fluids including a first fluid and a second fluid, the first fluid containing a gold ion and a nickel ion, at least one of the first fluid and the second fluid containing at least two substances each having a reducing property;
keeping a distance between the processing surfaces in a space by a balance between a force toward an approaching direction and a force toward a separation direction, the forces including a supply pressure of the fluids to be processed and a pressure applied between the processing surfaces;
by using said space kept between at least two processing surfaces as a flow path of the fluids to be processed, mixing the fluids to be processed into a thin film fluid; and
in this thin film fluid, separating out gold and nickel simultaneously to produce the gold-nickel alloy nanoparticle.

2. The method for producing a gold-nickel alloy nanoparticle according to claim 1, wherein the at least two substances each having a reducing property comprise at least one substance selected from the group consisting of a reducing agent, a dispersant showing a reducing property, and a solvent showing a reducing property.

3. A method for producing a gold-nickel alloy nanoparticle, which is a solid gold-nickel alloy nanoparticle, wherein as a result of microrange analysis of the solid gold-nickel alloy nanoparticle by a STEM-EDS analysis using a beam diameter of 0.2 nm, molar ratios of gold and nickel in 50% or more of analysis points thereof are detected within ±30% of molar ratios of gold and nickel obtained by ICP analysis result of the solid gold-nickel alloy nanoparticle, said method comprising the steps of:

supplying at least two fluids to be processed to between processing surfaces which relatively move so as to be able to approach to and separate from each other, the two fluids including a first fluid and a second fluid, the first fluid containing a gold ion and a nickel ion, at least one of the first fluid and the second fluid containing at least two substances each having a reducing property;

keeping a distance between the processing surfaces in a space by a balance between a force toward an approaching direction and a force toward a separation direction, the forces including a supply pressure of the fluids to be processed and a pressure applied between the processing surfaces;

by using said space kept between at least two processing surfaces as a flow path of the fluids to be processed, mixing the fluids to be processed into a thin film fluid; and in this thin film fluid, separating out gold and nickel simultaneously to produce the gold-nickel alloy nanoparticle.

4. The method for producing a gold-nickel alloy nanoparticle according to claim 3, wherein the at least two substances each having a reducing property comprise at least one substance selected from the group consisting of a reducing agent, a dispersant showing a reducing property, and a solvent showing a reducing property.

5. A method for producing a gold-nickel alloy nanoparticle, which is a solid gold-nickel alloy nanoparticle, wherein a nickel concentration contained in the gold-nickel alloy is in the range of 2.0 to 92.7% by weight, and the solid gold-nickel alloy nanoparticle comprises 50% or more by volume of a gold-nickel alloy showing a finely mixed state of gold and nickel in a nanometer level, said method comprising the steps of:

supplying at least two fluids to be processed to between processing surfaces which relatively move so as to be able to approach to and separate from each other, the two fluids including a first fluid and a second fluid, the first fluid containing a gold ion and a nickel ion, at least one of the first fluid and the second fluid containing at least two substances each having a reducing property;

keeping a distance between the processing surfaces in a space by a balance between a force toward an approaching direction and a force toward a separation direction, the forces including a supply pressure of the fluids to be processed and a pressure applied between the processing surfaces;

by using said space kept between at least two processing surfaces as a flow path of the fluids to be processed, mixing the fluids to be processed into a thin film fluid; and in this thin film fluid, separating out gold and nickel simultaneously to produce the gold-nickel alloy nanoparticle.

6. The method for producing a gold-nickel alloy nanoparticle according to claim 5, wherein the at least two substances each having a reducing property comprise at least one substance selected from the group consisting of a reducing agent, a dispersant showing a reducing property, and a solvent showing a reducing property.

* * * * *